(12) United States Patent
Lee et al.

(10) Patent No.: US 11,435,780 B2
(45) Date of Patent: Sep. 6, 2022

(54) ELECTRONIC DEVICE FOR IMPROVING VISIBILITY OF CURVED PORTION OF DISPLAY AND METHOD FOR OPERATING THE SAME

(71) Applicant: SAMSUNG ELECTRONICS CO., LTD., Suwon-si (KR)

(72) Inventors: Sungjun Lee, Suwon-si (KR); Seungjin Kim, Suwon-si (KR); Jiyong Kim, Suwon-si (KR); Jungchul An, Suwon-si (KR); Joungmin Cho, Suwon-si (KR); Kwangtai Kim, Suwon-si (KR); Donghyun Yeom, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 189 days.

(21) Appl. No.: 16/743,656

(22) Filed: Jan. 15, 2020

(65) Prior Publication Data
US 2020/0319673 A1    Oct. 8, 2020

(30) Foreign Application Priority Data

Apr. 5, 2019    (KR) .......................... 10-2019-0040043

(51) Int. Cl.
G06F 1/16       (2006.01)
G09G 3/20       (2006.01)
H04N 13/106     (2018.01)

(52) U.S. Cl.
CPC .......... *G06F 1/1618* (2013.01); *G06F 1/1641* (2013.01); *G06F 1/1681* (2013.01);
(Continued)

(58) Field of Classification Search
CPC .. H04M 1/0243; G06F 1/1618; G06F 1/1647; G06F 1/1677; G06F 1/1681; G09G 5/10; G09G 3/2096; G09G 2340/0464
See application file for complete search history.

(56) References Cited

U.S. PATENT DOCUMENTS

2013/0215088 A1*   8/2013   Son ...................... G06F 3/0488
                                                          345/204
2013/0257775 A1   10/2013   Lee
(Continued)

FOREIGN PATENT DOCUMENTS

CN      108196810        6/2018
EP      2793214         10/2014
(Continued)

OTHER PUBLICATIONS

International Search Report and Written Opinion dated Apr. 22, 2020 in counterpart International Patent Application No. PCT/KR2020/000686.
(Continued)

*Primary Examiner* — Abbas I Abdulselam
(74) *Attorney, Agent, or Firm* — Nixon & Vanderhye P.C.

(57) ABSTRACT

In an electronic device and a method for operating the electronic device according to various embodiments, an electronic device may include a foldable housing including a hinge, a first housing connected to the hinge, and a second housing connected to the hinge and configured to be foldable with the first housing about the hinge, a display including a bent area in a state in which the first housing and the second housing are folded with respect to each other, a processor disposed in the first housing or the second housing and operatively connected to the display, and a memory operatively connected to the processor, and the memory may be configured to store instructions that, when executed, cause the processor to control the electronic device to: identify a folding degree between the first housing and the second housing, generate a first image based on mapping data in which the folding degree and characteristics of the first image are mapped, generate a synthetic image of the first image and a second image corresponding to the bent area wherein the generated first image is overlaid in at least a
(Continued)

partial area of the second image, and display the generated synthetic image.

18 Claims, 21 Drawing Sheets

(52) U.S. Cl.
CPC ......... *G09G 3/2096* (2013.01); *H04N 13/158* (2018.05); *G09G 2320/0693* (2013.01); *G09G 2340/0464* (2013.01)

(56) References Cited

U.S. PATENT DOCUMENTS

| | | | |
|---|---|---|---|
| 2014/0071043 A1* | 3/2014 | Jung | G06F 3/03 345/156 |
| 2014/0306985 A1 | 10/2014 | Jeong et al. | |
| 2015/0169006 A1* | 6/2015 | Chong | G09G 3/3225 345/173 |
| 2015/0301672 A1 | 10/2015 | Kim et al. | |
| 2015/0338888 A1 | 11/2015 | Kim et al. | |
| 2016/0012797 A1 | 1/2016 | Lee et al. | |
| 2016/0093240 A1 | 3/2016 | Aurongzeb et al. | |
| 2016/0133169 A1 | 5/2016 | Park et al. | |
| 2016/0239177 A1* | 8/2016 | Nakagawa | G06F 3/0482 |
| 2017/0061836 A1* | 3/2017 | Kim | G06F 1/1641 |
| 2017/0169759 A1 | 6/2017 | Jang | |
| 2017/0206049 A1 | 7/2017 | Choi et al. | |
| 2017/0358252 A1 | 12/2017 | Bhageria et al. | |
| 2018/0307277 A1* | 10/2018 | Yanagisawa | G06F 1/1643 |
| 2019/0005879 A1 | 1/2019 | Shin | |
| 2021/0066641 A1* | 3/2021 | Ai | H01L 51/524 |

FOREIGN PATENT DOCUMENTS

| | | |
|---|---|---|
| EP | 3422333 | 1/2019 |
| JP | 2015-138258 | 7/2015 |
| KR | 10-2015-0121383 | 10/2015 |
| KR | 10-2016-0032079 | 3/2016 |
| KR | 10-2017-0049777 | 5/2017 |

OTHER PUBLICATIONS

Extended European Search Report and Written Opinion dated Aug. 6, 2020 in corresponding European Application No. 20154326.1.

* cited by examiner

ELECTRONIC DEVICE FOR IMPROVING VISIBILITY OF CURVED PORTION OF DISPLAY AND METHOD FOR OPERATING THE SAME

CROSS-REFERENCE TO RELATED APPLICATION

This application is based on and claims priority under 35 U.S.C. § 119 to Korean Patent Application No. 10-2019-0040043, filed on Apr. 5, 2019, in the Korean Intellectual Property Office, the disclosure of which is incorporated by reference herein in its entirety.

BACKGROUND

1) Field

The disclosure relates to an electronic device and a method for operating an electronic device, and for example, to a technology improving the visibility of a curved portion of a display.

2) Description of Related Art

Various electronic devices, such as smartphones, tablet PCs, portable multimedia players (PMPs), personal digital assistants (PDAs), laptop personal computers (PCs), and wearable devices, are being distributed. In addition, in recent years, electronic devices (e.g., foldable devices) that include flexible displays having flexible characteristics and has foldable characteristics are being distributed.

In recent years, studies on foldable electronic devices having housings that may be folded or unfolded about hinge structures have been actively made. The foldable electronic devices are expected to be next-generation electronic devices that can enlarge the areas of the displays in unfolded states and have reduced volumes in folded states, thereby increasing the conveniences of the users.

The display included in a foldable device may include a curved portion that may be folded in a state in which the foldable device has an angle between a folded state and a unfolded state. A luminance or color difference of a folded portion and a flat portion may occur in the display including the curved portion according to a folding degree. The phenomenon may occur due to the difference in the index of refraction according to the folding degree. The phenomenon may cause degradation of the visibility of the user. Moreover, it may cause inconvenience of use of the foldable device to the user.

The above information is presented as background information only to assist with an understanding of the disclosure. No determination has been made, and no assertion is made, as to whether any of the above might be applicable as prior art with regard to the disclosure.

SUMMARY

According to an example aspect of the disclosure, an electronic device includes: a foldable housing including: a hinge; a first housing connected to the hinge; and a second housing connected to the hinge and configured to be foldable with the first housing about the hinge; a display including a bent area in a state in which the first housing and the second housing are folded with respect to each other; a processor disposed in the first housing or second housing and operatively connected to the display; and a memory operatively connected to the processor, wherein the memory is configured to store instructions that, when executed, cause the processor to control the electronic device to: identify a folding degree between the first housing and the second housing; generate a first image based on mapping data in which the folding degree and characteristics of the first image are mapped; generate a synthetic image of the first image and a second image corresponding to the bent area wherein the generated first image is overlaid in at least a partial area of the second image; and display the generated synthetic image.

According to another example aspect of the disclosure, an electronic device includes: a foldable housing including: a hinge; a first housing connected to the hinge; and a second housing connected to the hinge and being foldable with the first housing about the hinge; a display including a bent area in a state in which the first housing and the second housing are folded with respect to each other; a processor disposed in the first housing or second housing and operatively connected to the display; and a memory operatively connected to the processor, wherein the memory is configured to store instructions that, when executed, cause the processor to control the electronic device to: detect a change in a folding degree between the first housing and the second housing while a synthetic image in which a first image, generated based on mapping data in which the folding degree between the first housing and the second housing and characteristics of the first image are mapped, is displayed and a second image corresponding to the bent area are synthetized with each other wherein the first image is overlaid in a partial area of a second image; change characteristics of the first image based on the changed folding degree and the mapping data; and display the synthetic image of the first image and the second image wherein the changed first image is overlaid in at least a partial area of the second image.

According to another example aspect of the disclosure, a method for operating an electronic device includes: identifying a folding degree between a first housing connected to a hinge, and a second housing connected to the hinge and being foldable with the first housing about the hinge; generating a first image based on mapping data in which the folding degree and characteristics of the first image are mapped; generating a synthetic image of the first image and a second image corresponding to the bent area wherein the generated first image is overlaid in at least a partial area of the second image; and displaying the generated synthetic image.

According to the electronic device and the method for operating the same according to various example embodiments of the disclosure, an image for decreasing the luminance difference can be overlaid on an area corresponding to the curved portion in consideration of the folding degrees of the first housing and the second housing. Accordingly, degradation of visibility due to a luminance difference can be prevented and/or reduced.

According to the electronic device and the method for operating the same according to various example embodiments of the disclosure, the luminance of the overlaid image can be adjusted in consideration of the folding degrees of the first housing and the second housing. Accordingly, degradation of visibility due to a luminance difference can be prevented and/or reduced.

According to the electronic device and the method for operating the same according to various example embodiments of the disclosure, the luminance of the area corresponding to a folded portion on the foldable device having one display driver integrated circuit can be adjusted in a manner in which the image for decreasing the luminance difference is overlaid. Accordingly, an operation of adjusting the luminance of a specific area can be implemented by one display driver integrated circuit without using a plurality of display driver integrated circuits.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
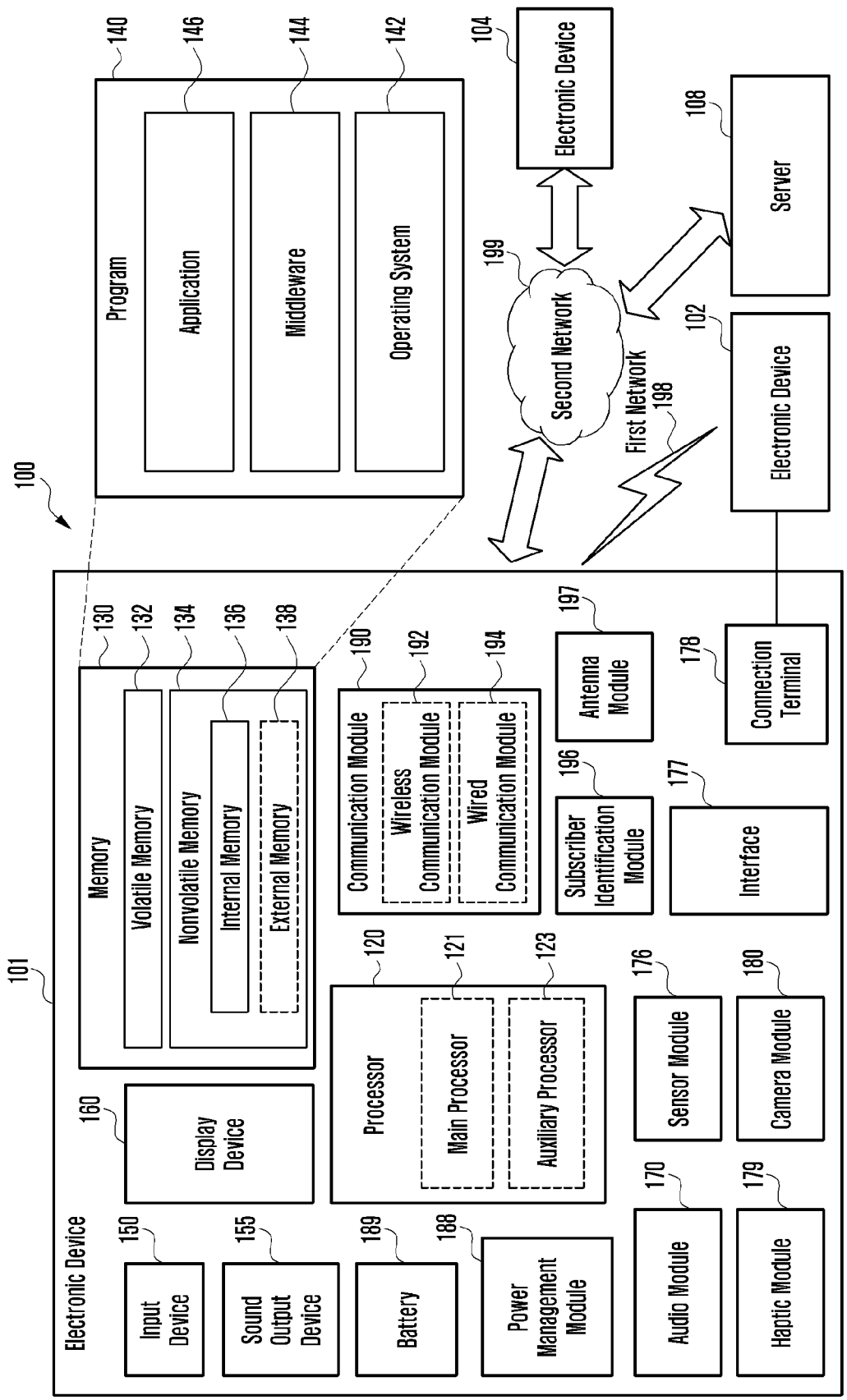
FIG. 1 is a block diagram illustrating an example electronic device according to various embodiments of the disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
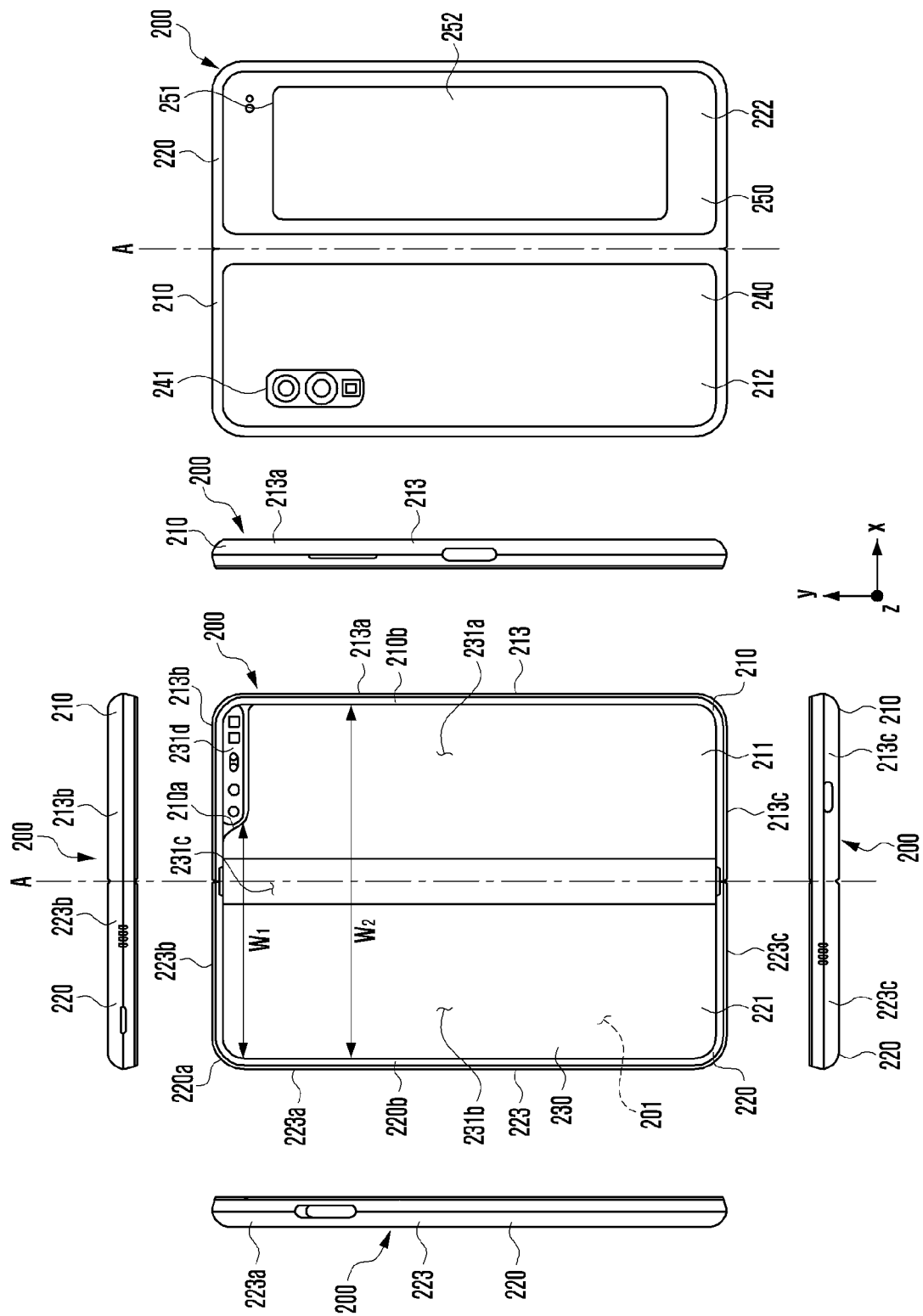
FIG. 2A is a diagram illustrating an unfolded state of an example electronic device according to various embodiments of the disclosure.
Figure 2B:
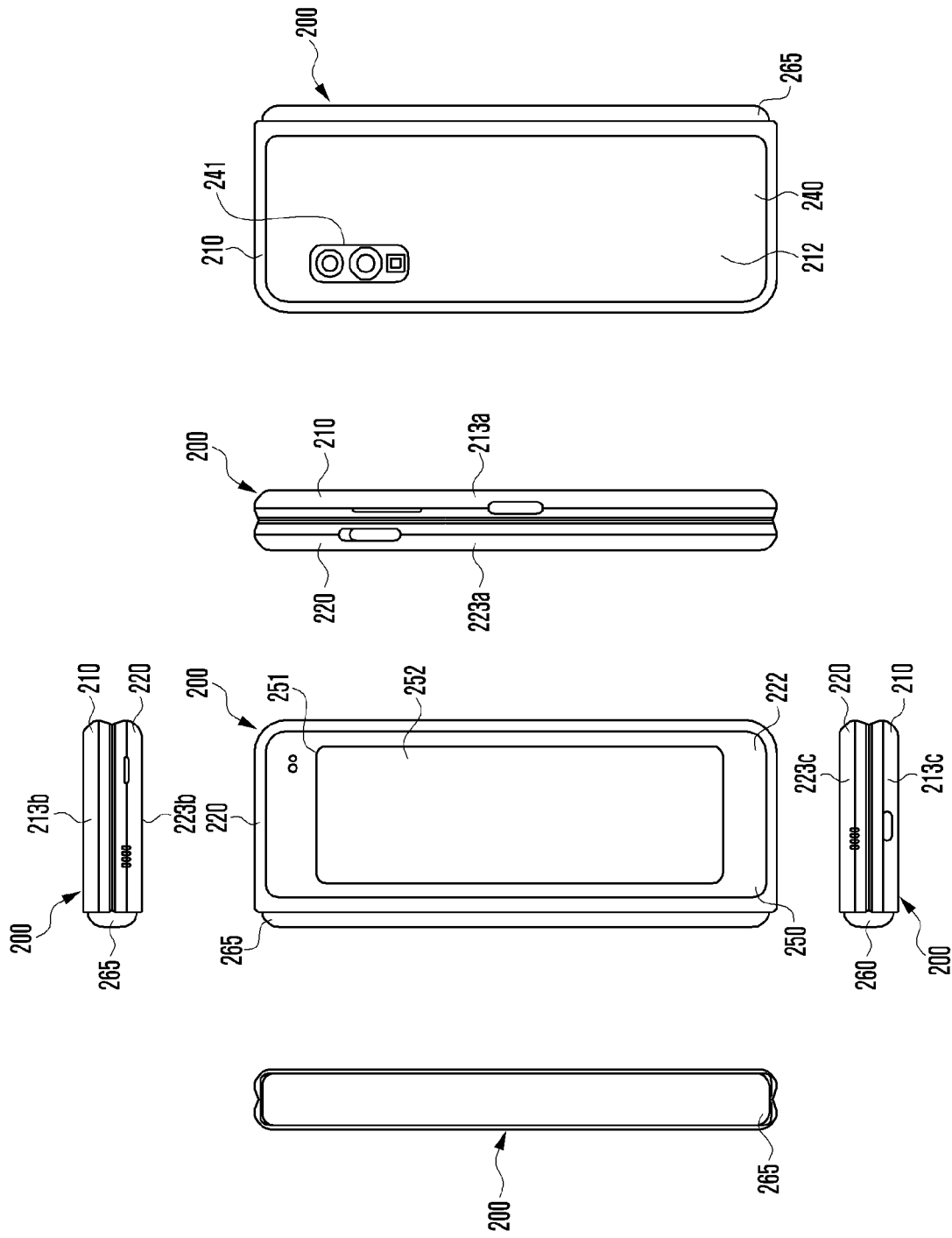
FIG. 2B is a diagram illustrating a folded state of an example electronic device according to various embodiments of the disclosure.

FIG. 2A is a diagram illustrating an example electronic device 200 in an unfolded state according to various embodiments, and FIG. 2B is a diagram illustrating the example electronic device 200 shown in FIG. 2A in a folded state according to various embodiments.

The electronic device 200 in FIGS. 2A and 2B may be, at least in part, similar to the electronic device 101 in FIG. 1, or may include other embodiments of the electronic device.

Referring to FIG. 2A, the electronic device 200 may include a pair of housing structures 210 and 220 rotatably coupled to each other through a hinge structure (e.g., a hinge structure 264 in FIG. 3) so as to be folded relative to each other, a hinge cover 265 covering a foldable portion of the pair of housing structures 210 and 220, and a display 230 (e.g., a flexible display or a foldable display) provided in a space formed by the pair of housing structures 210 and 220. In this document, a surface on which the display 230 is provided may be defined as a front surface of the electronic device 200, and a surface opposite the front surface may be defined as a rear surface of the electronic device 200. In addition, the surface surrounding the space between the front surface and the rear surface may be defined as a side surface of the electronic device 200.

In an embodiment, the pair of housing structures 210 and 220 may include a first housing structure 210 including a sensor area 231d, a second housing structure 220, a first rear cover 240, and a second rear cover 250. The pair of housing structures 210 and 220 of the electronic device 200 is not limited to the shape and connection shown in FIGS. 2A and 2B, but may be implemented by combinations and/or connections of other shapes or components. For example, in another embodiment, the first housing structure 210 and the first rear cover 240 may be integrally formed, and the second housing structure 220 and the second rear cover 250 may be integrally formed.

According to an embodiment, the first housing structure 210 and the second housing structure 220 may be provided at both sides with respect to a folding axis (an axis A), and may have shapes that are symmetric overall with respect to the folding axis (the axis A). According to an embodiment, an angle or a distance between the first housing structure 210 and the second housing structure 220 may vary depending on whether the electronic device 200 is in an unfolded state, an folded state, or an intermediate state. According to an embodiment, unlike the second housing structure 220, the first housing structure 210 may further include a sensor area 231d in which various sensors are provided, but may be symmetric with the second housing structure 220 in the area other than the sensor area 231d. In another embodiment, the sensor area 231d may be further provided in or replaced with at least a portion of the second housing structure 220.

In an embodiment, the first housing structure 210 may be connected to a hinge structure (e.g., a hinge structure 264 in FIG. 3), and may have a first surface 211 provided to face the front surface of the electronic device 200 in an unfolded state of the electronic device 200, a second surface 212 directed in the direction opposite the first surface 211, and a first side member 213 surrounding at least a portion of the space between the first surface 211 and the second surface 212. In an embodiment, the first side member 213 may include a first side surface 213a provided in parallel to the folding axis (the axis A), a second side surface 213b extending from one end of the first side surface 213a in the direction perpendicular to the folding axis, the third side surface 213c extending from the opposite end of the first side surface 213a in the direction perpendicular to the folding axis (the axis A).

In an embodiment, the second housing structure 220 may be connected to a hinge structure (e.g., a hinge structure 264 in FIG. 3), and may have a third surface 221 provided to face the front surface of the electronic device 200 in an unfolded state of the electronic device 200, a fourth surface 222 directed in the direction opposite the third surface 221, and a second side member 220 surrounding at least a portion of the space between the third surface 221 and the fourth surface 222. In an embodiment, the second side member 220 may include a fourth side surface 223a provided in parallel to the folding axis (the axis A), a fifth side surface 223b extending from one end of the fourth side surface 223a in the direction perpendicular to the folding axis (the axis A), and a sixth side surface 223c extending from the opposite end of the fourth side surface 223a in the direction perpendicular to the folding axis (the axis A). In an embodiment, the third surface 221 may face the first surface 211 in a folded state.

In an embodiment, the electronic device 200 may include a recess 201 formed to receive a display 230 through structural shape coupling of the first housing structure 210 and the second housing structure 220. The recess 201 may have substantially the same size as the display 230. In an embodiment, the recess 201 may have two or more different widths in the direction perpendicular to the folding axis (the axis A) due to the sensor area 231d. For example, the recess 201 may have a first width (W1) between a first portion 220a parallel to the folding axis (the axis A) of the second housing structure 220 and a first portion 210a formed at the edge of the sensor area 231d of the first housing structure 210 and a second width (W2) between a second portion 220b of the second housing structure 210 and a second portion 210b that is parallel to the folding axis (the axis A) and does not belong to the sensor area 213d in the first housing structure 210. In this case, the second width (W2) may be greater than the first width (W1). For example, the recess 201 may be formed so as to have a first width (W1) from a first portion 210a of the first housing structure 210, which has an asymmetric shape, to a first portion 220a of the second housing structure 220 and a second width (W2) from the second portion 210b of the first housing structure 210, which has a symmetric shape, to the second portion 220b of the second housing structure 220. In an embodiment, the first portion 210a and the second portion 210b of the first housing structure 210 may be formed so as to have different distances from the folding axis (the axis A). The width of the recess 201 is not limited to the illustrated example. In various embodiments, the recess 201 may have two or more different widths due to the shape of the sensor area 213d or the asymmetric shapes of the first housing structure 210 and the second housing structure 220.

In an embodiment, at least a portion of the first housing structure 210 and the second housing structure 220 may be made of a metallic or non-metallic material having a selected intensity of rigidity in order to support the display 230.

In an embodiment, the sensor area 231d may be provided adjacent to a corner of the first housing structure 210 so as to have a predetermined area. However, the arrangement, shape, or size of the sensor area 231d is not limited to the illustrated example. For example, in other embodiments, the sensor area 231d may be provided at another corner of the first housing structure 210 or in any area between the top and bottom corners. In another embodiment, the sensor area 231d may be provided in at least a portion of the second housing structure. In another embodiment, the sensor area 231d may be arranged to extend over the first housing structure 210 and the second housing structure 220. In an embodiment, the electronic device 200 may include components that are arranged to be exposed to the front surface of the electronic device 200 through the sensor area 213d or through one or more openings provided in the sensor area 231d, thereby executing various functions. In various embodiments, the components may include at least one of, for example, a front camera device, a receiver, a proximity sensor, an illuminance sensor, an iris recognition sensor, an ultrasonic sensor, or an indicator.

In an embodiment, the first rear cover 240 may be provided on the second surface 212 of the first housing structure 210, and may have a substantially rectangular periphery. In an embodiment, at least a portion of the periphery may be wrapped by the first housing structure 210. Similarly, the second rear cover 250 may be provided on the fourth surface 222 of the second housing structure 220, and at least a portion of the periphery thereof may be wrapped by the second housing structure 220.

In the illustrated embodiment, the first rear cover 240 and the second rear cover 250 may be substantially symmetric with respect to the folding axis (the axis A). In another embodiment, the first rear cover 240 and the second rear cover 250 may have various shapes different from each other. In another embodiment, the first rear cover 240 may be integrally formed with the first housing structure 210, and the second rear cover 250 may be integrally formed with the second housing structure 220.

In an embodiment, the first rear cover 240, the second rear cover 250, the first housing structure 210, and the second housing structure 220 may be coupled to each other to provide a space to receive various components of the electronic device 200 (e.g., a printed circuit board, an antenna module, a sensor module, or a battery). In an embodiment, one or more components may be provided on the rear surface of the electronic device 200, or may be visually exposed therefrom. For example, one or more components or sensors may be visually exposed through a first rear area 241 of the first rear cover 240. In various embodiments, the sensor may include a proximity sensor, a rear camera device, and/or a flash. In another embodiment, at least a portion of a sub-display 252 may be visually exposed through a second rear area 251 of the second rear cover 250.

The display 200 may be provided in a space formed by the foldable housing 210 and 220. For example, the display 200 may be placed in a recess (e.g., the recess 201 in FIG. 2A) formed by the pair of housing structures 210 and 220, and may be arranged so as to substantially occupy most of the front surface of the electronic device 200. Accordingly, the front surface of the electronic device 200 may include a display 230, a portion (e.g., an edge area) of the first housing structure 210 adjacent to the display 230, and a portion (e.g., an edge area) of the second housing structure 220. In an embodiment, the rear surface of the electronic device 200 may include a first rear cover 240, a portion (e.g., an edge area) of the first housing structure 210 adjacent to the first rear cover 240, a second rear cover 250, and a portion (e.g., an edge area) of the second housing structure 220 adjacent to the second rear cover 250.

In an embodiment, the display 230 may refer to a display of which at least a portion may be transformed into a flat or curved surface. In an embodiment, the display 230 may include a folding area 231c, a first area 231a provided at one side of the folding area 231c (e.g., at the right side of the folding area 231c), and a second area 231b provided at the opposite side of the folding area 231c (e.g., at the left side of the folding area 231c). For example, the first area 231a may be provided on the first surface 211 of the first housing structure 210, and the second area 231b may be provided on the third surface 221 of the second housing structure 220. In an embodiment, the division of the display 230 is illustrated as only an example, and the display 230 may be divided into a plurality of areas (e.g., two areas or four or more areas) according to the structure or functions thereof. Although the area of the display 230 may be divided with respect to the folding area 231c or the folding axis (the axis A) extending in parallel to the y-axis in the embodiment shown in FIG. 2A, the display 230 may be divided based on another folding area (e.g., a folding area parallel to the x-axis) or another folding axis (e.g., a folding axis parallel to the x-axis) in another embodiment. Even though the display is physically divided into several areas by the pair of housing structures 210 and 220 and the hinge structure (e.g., the hinge structure 264 in FIG. 3) as described above, the display 230 may substantially display a full screen through the pair of housing structures 210 and 220 and the hinge structure (e.g., the hinge structure 264 in FIG. 3). In an embodiment, the first area 231a and the second area 231b may have a symmetric shape overall with respect to the folding area 231c. However, unlike the second area 231b, the first area 231a may include a notch area (e.g., a notch area 233 in FIG. 3) obtained by cutting an area corresponding to the sensor area 231d, but other portions of the first area 231a, excluding the notch area, may be symmetric with the second area 231b. For example, the first area 231a and the second area 231b may include portions having a symmetric shape and portions having an asymmetric shape.

Figure 3:
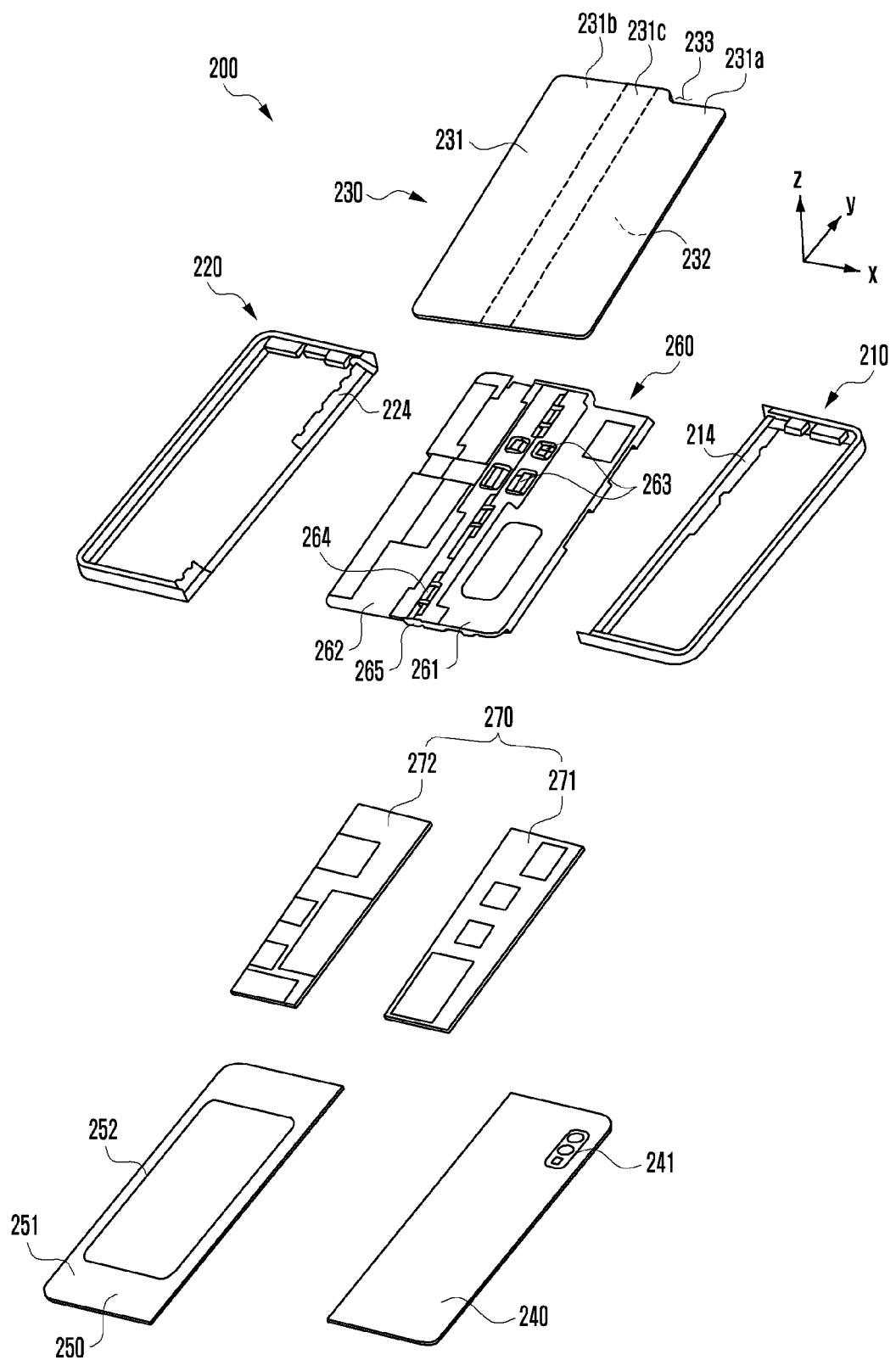
FIG. 3 is an exploded perspective view illustrating an example electronic device according to various embodiments of the disclosure.

Referring to FIG. 2B, the hinge cover 265 is provided between the first housing structure 210 and the second housing structure 220 so as to cover internal components (e.g., the hinge structure 264 in FIG. 3). In an embodiment, the hinge cover 265 may be covered or exposed to the outside by a portion of the first housing structure 210 and the second housing structure 220 according to an operating state of the electronic device 200 (an unfolded state or a folded state).

For example, if the electronic device 200 is in an unfolded state as shown in FIG. 2A, the hinge cover 265 may be covered by the first housing structure 210 and the second housing structure 220 so as not to be exposed. For example, if the electronic device 200 is in a folded state (e.g., a completely folded state) as shown in FIG. 2B, the hinge cover 265 may be exposed to the outside between the first housing structure 210 and the second housing structure 220. For example, if the electronic device 200 is in an intermediate state in which the first housing structure 210 and the second housing structure 220 are folded at a certain angle, a portion of the hinge cover 265 may be exposed to the outside of the electronic device 200 between the first housing structure 210 and the second housing structure 220. In this case, the exposed area may be smaller than that in the fully folded state. In an embodiment, the hinge cover 265 may include a curved surface.

Hereinafter, the operation of the first housing structure 210 and the second housing structure 220 and respective areas of the display 230 according to the operating state of the electronic device 200 (e.g., an unfolded state and a folded state) will be described.

In an embodiment, if the electronic device 200 is in an unfolded state (e.g., the state shown in FIG. 2A), the first housing structure 210 and the second housing structure 220 are at an angle of 180 degrees with each other, and the first area 231a and the second area 231b of the display may be provided to be directed in the same direction. In addition, the folding area 231c may be on the same plane as the first area 231a and the second area 231b.

In an embodiment, if the electronic device 200 is in a folded state (e.g., the state shown in FIG. 2B), the first housing structure 210 and the second housing structure 220 may be arranged so as to face each other. The first area 231a and the second area 231b of the display 230 may face each other at a sharp angle (e.g., 0 degrees to 10 degrees). The folding area 231c may be configured, at least in part, as a curved surface having a predetermined curvature.

In an embodiment, if the electronic device 200 is in an intermediate state, the first housing structure 210 and the second housing structure 220 may be arranged at a certain angle with each other. The first area 231a and the second area 231b of the display 230 may be at an angle greater than the angle in the folded state and smaller than the angle in the unfolded state. The folding area 231c may be configured, at least in part, as a curved surface having a predetermined curvature, and the curvature may be smaller than the angle in the folded state.

FIG. 3 is an exploded perspective view illustrating the example electronic device 200 according to various embodiments.

Referring to FIG. 3, in an embodiment, the electronic device 200 may include a display 230, a bracket assembly 260, one or more printed circuit boards 270, a first housing structure 210, a second housing structure 220, a first rear cover 240, and a second rear cover 250. In this disclosure, the display 230 may, for example, be referred to as a "display module" or a "display assembly".

The display 230 may include a display panel 231 (e.g., a flexible display panel) and one or more plates 232 or layers on which the display panel 231 is placed. In an embodiment, the plate 232 may be provided between the display panel 231 and the bracket assembly 260. A display panel 231 may be provided in at least a portion of one surface of the plate 232 (e.g., the surface directed in the z-direction in FIG. 3). The plate 232 may be formed in a shape corresponding to the display panel 231. For example, a portion of the plate 232 may be formed in a shape corresponding to the notch area 233 of the display panel 231.

The bracket assembly 260 may include a first bracket 261, a second bracket 262, a hinge structure 264 provided between the first bracket 261 and the second bracket 262, a hinge cover 265 covering the hinge structure 264 so as not to be viewed from the outside, and a wiring member 263 provided across the first bracket 261 and the second bracket 262 {e.g., a flexible printed circuit board (FPCB)}.

In an embodiment, the bracket assembly 260 may be provided between the plate 232 and one or more printed circuit boards 270. For example, the first bracket 261 may be provided between the first area 231a of the display 230 and a first printed circuit board 271. The second bracket 262 may be provided between the second area 231b of the display 230 and a second printed circuit board 272.

In an embodiment, at least a portion of the wiring member 263 and the hinge structure 264 may be provided inside the bracket assembly 260. The wiring member 263 may be arranged in a direction crossing the first bracket 261 and the second bracket 262 (e.g., in the x-axis direction). The wiring member 263 may be arranged in a direction (e.g., the x-axis direction) perpendicular to a folding axis (e.g., the y-axis or the folding axis A in FIG. 1) of the folding area 231c.

One or more printed circuit boards 270 may include a first printed circuit board 271 provided on the side of the first bracket 261 and a second printed circuit board 272 provided on the side of the second bracket 262 as mentioned above. The first printed circuit board 271 and the second printed circuit board 272 may be provided in a space formed by the bracket assembly 260, the first housing structure 210, the second housing structure 220, the first rear cover 240, and the second rear cover 250. The first printed circuit board 271 and the second printed circuit board 272 may have components mounted thereon so as to implement various functions of the electronic device 200.

In an embodiment, the first housing structure 210 and the second housing structure 220 may be assembled so as to be coupled to both sides of the bracket assembly 260 in the state in which the display 230 is coupled to the bracket assembly 260. As described later, the first housing structure 210 and the second housing structure 220 may be coupled to the bracket assembly 260 by sliding on both sides of the bracket assembly 260.

In an embodiment, the first housing structure 210 may include a first rotary support surface 214, and the second housing structure 520 may include a second rotary support surface 224 corresponding to the first rotary support surface 214. The first rotary support surface 214 and the second rotary support surface 224 may include curved surfaces corresponding to curved surfaces provided in the hinge cover 265.

In an embodiment, if the electronic device 200 is in an unfolded state (e.g., the state shown in FIG. 2A), the first rotary support surface 214 and the second rotary support surface 224 may cover the hinge cover 265 so as to prevent and/or reduce the hinge cover 265 of the electronic device 200 from being exposed to the rear surface of the electronic device 200 or so as to minimize and/or reduce the exposure thereof. In an embodiment, if the electronic device 200 is in a folded state (e.g., the state shown in FIG. 2B), the first rotary support surface 214 and the second rotary support surface 224 may rotate along curved surfaces provided in the hinge cover 265 so that the hinge cover 265 may be fully exposed to the rear surface of the electronic device 200.

Figure 4:
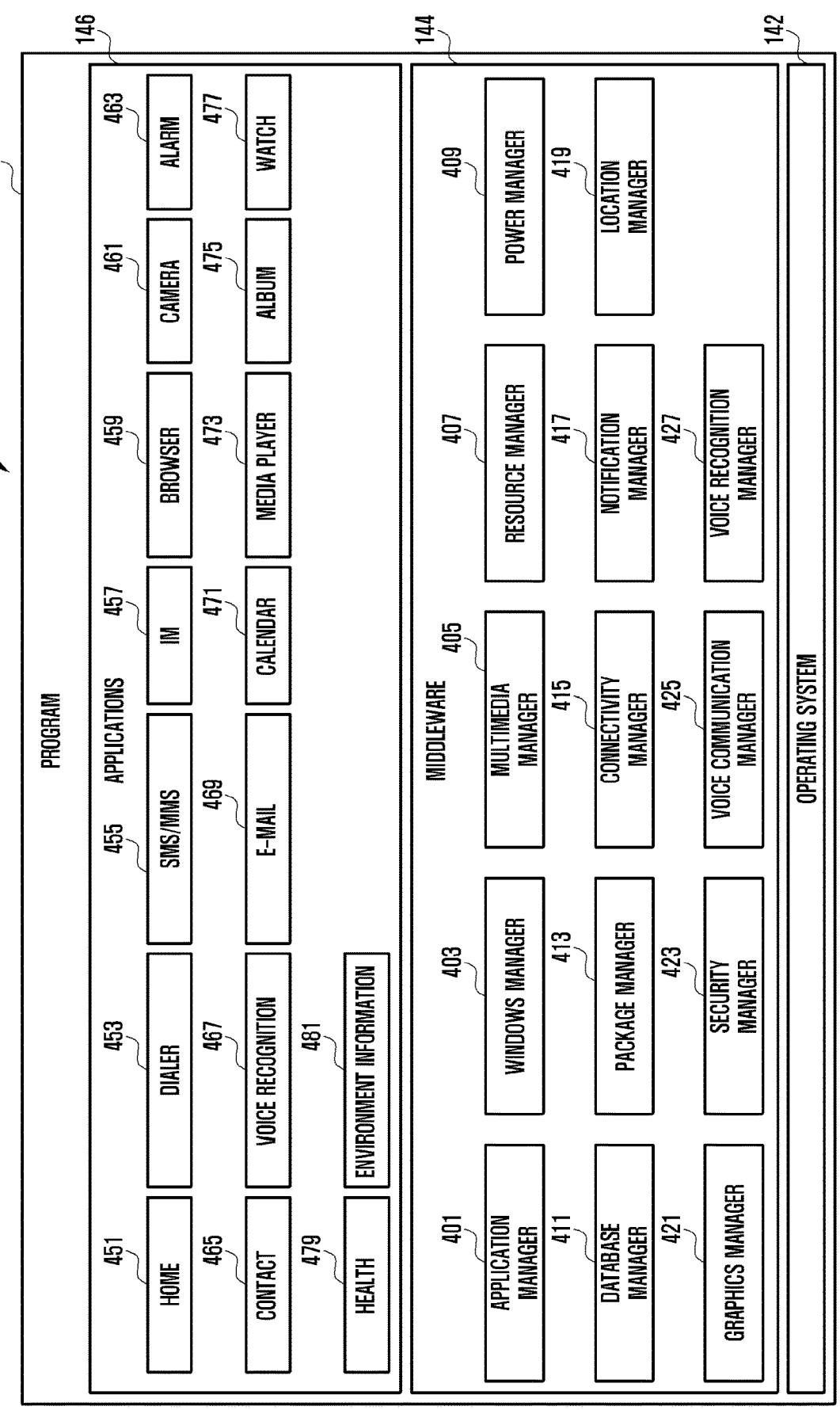
FIG. 4 is a block diagram illustrating an example program according to various embodiments of the disclosure.

FIG. 4 is a block diagram 400 illustrating an example program 140 according to various embodiments. According to an embodiment, the program 140 may include an operating system (OS) 142 to control one or more resources of the electronic device 101, middleware 144, and/or an application 146 executable in the OS 142. The OS 142 may include, for example, Android™, iOS™, Windows™, Symbian™, Tizen™, or Bath™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 401, a window manager 403, a multimedia manager 405, a resource manager 407, a power manager 409, a database manager 411, a package manager 413, a connectivity manager 415, a notification manager 417, a location manager 419, a graphics manager 421, a security manager 423, a telephony (e.g., voice communication) manager 425, and/or a voice recognition manager 427.

The application manager 401, for example, may manage the life cycle of the application 146. The window manager 403, for example, may manage one or more graphical user interface (GUI) resources that are used on a screen. The multimedia manager 405, for example, may identify one or more formats to be used to play media files, and may encode or decode a corresponding one of the media files using a codec appropriate for a corresponding format selected from the one or more formats. The resource manager 407, for example, may manage the source code of the application 146 or a memory space of the memory 130. The power manager 409, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 409 may interwork with a basic input/output system (BIOS) (not shown) of the electronic device 101.

The database manager 411, for example, may generate, search, or change a database to be used by the application 146. The package manager 413, for example, may manage installation or update of an application that is distributed in the form of a package file. The connectivity manager 415, for example, may manage a wireless connection or a direct connection between the electronic device 101 and the external electronic device. The notification manager 417, for example, may provide a function to notify a user of an occurrence of a specified event (e.g., an incoming call, message, or alert). The location manager 419, for example, may manage locational information on the electronic device 101. The graphics manager 421, for example, may manage one or more graphic effects to be offered to a user or a user interface related to the one or more graphic effects.

The security manager 423, for example, may provide system security or user authentication. The telephony or voice communication manager 425, for example, may manage a voice call function or a video call function provided by the electronic device 101. The voice recognition manager 427, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 444 may dynamically delete some existing components or add new components. According to an embodiment, at least part of the middleware 144 may be included as part of the OS 142 or may be implemented as another software separate from the OS 142.

The application 146 may include, for example, a home 451, dialer 453, short message service (SMS)/multimedia messaging service (MMS) 455, instant message (IM) 457, browser 459, camera 461, alarm 463, contact 465, voice recognition 467, e-mail 469, calendar 471, media player 473, album 475, watch 477, health 479 (e.g., for measuring the degree of workout or biometric information, such as blood sugar), and/or environmental information 481 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 469) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

Figure 5A:
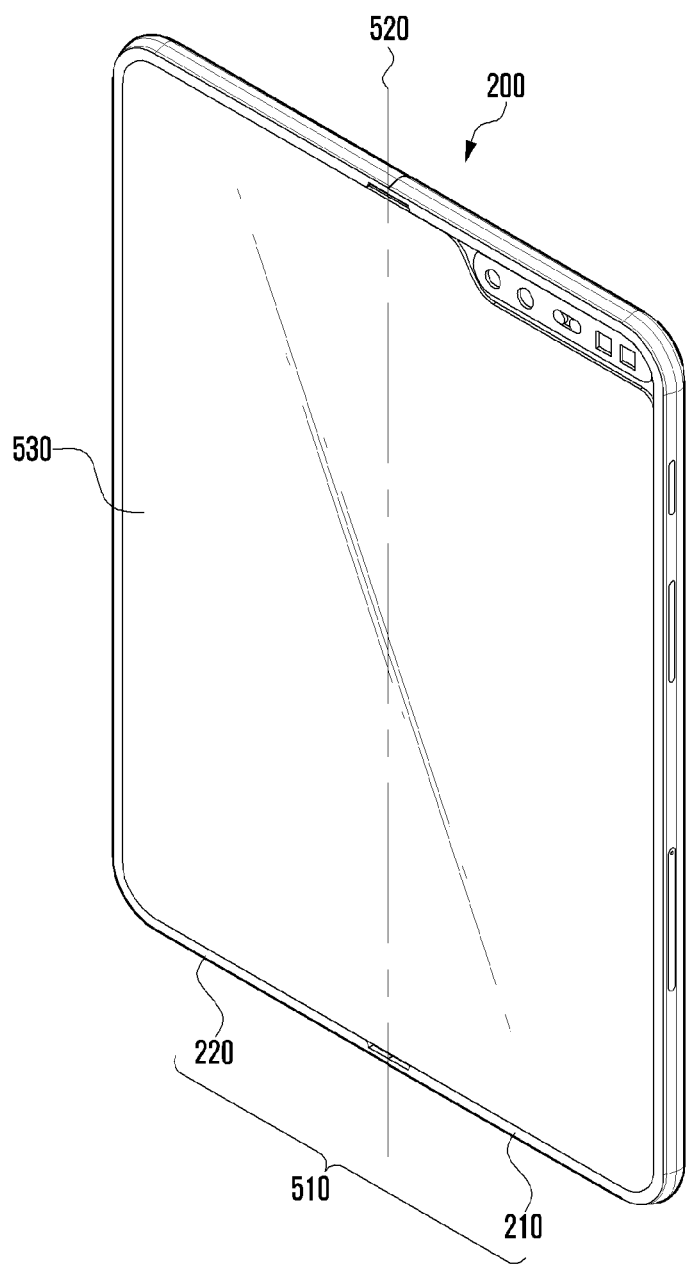
FIG. 5A is a front perspective view illustrating an example electronic device according to various embodiments of the disclosure.
Figure 5B:
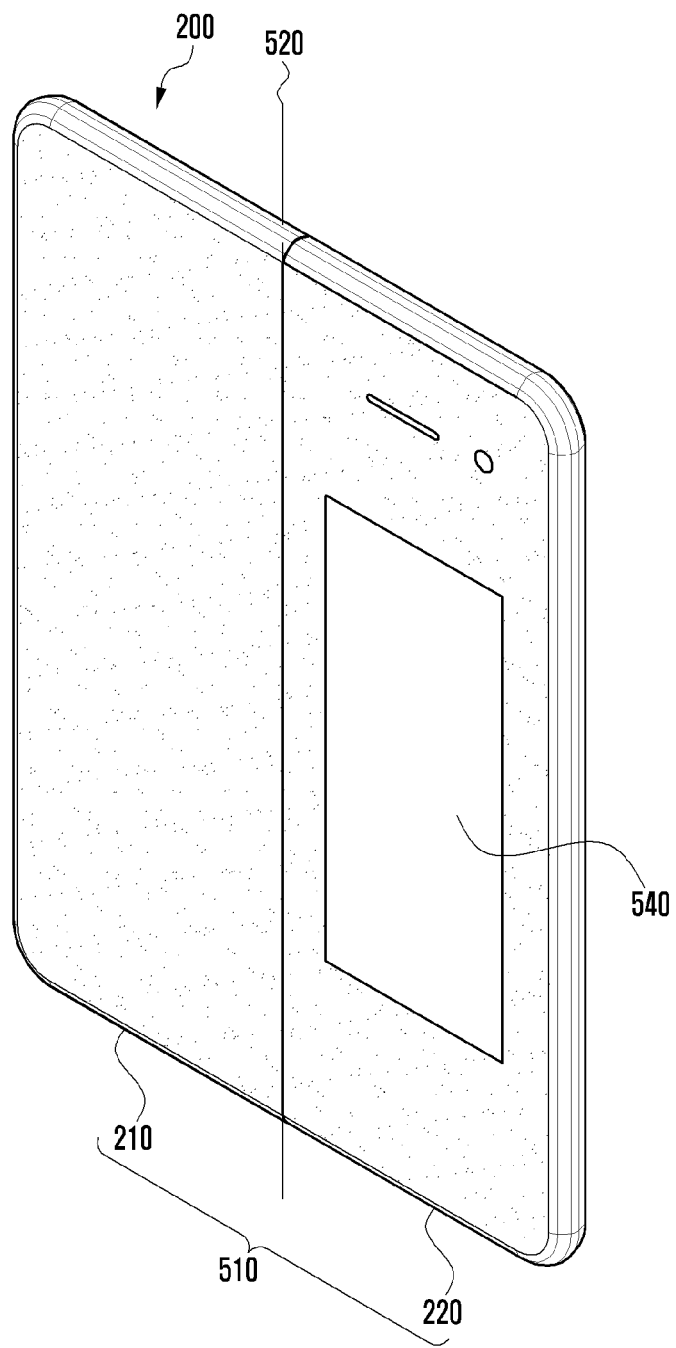
FIG. 5B is a rear perspective view illustrating an example electronic device according to various embodiments of the disclosure.
Figure 5C:
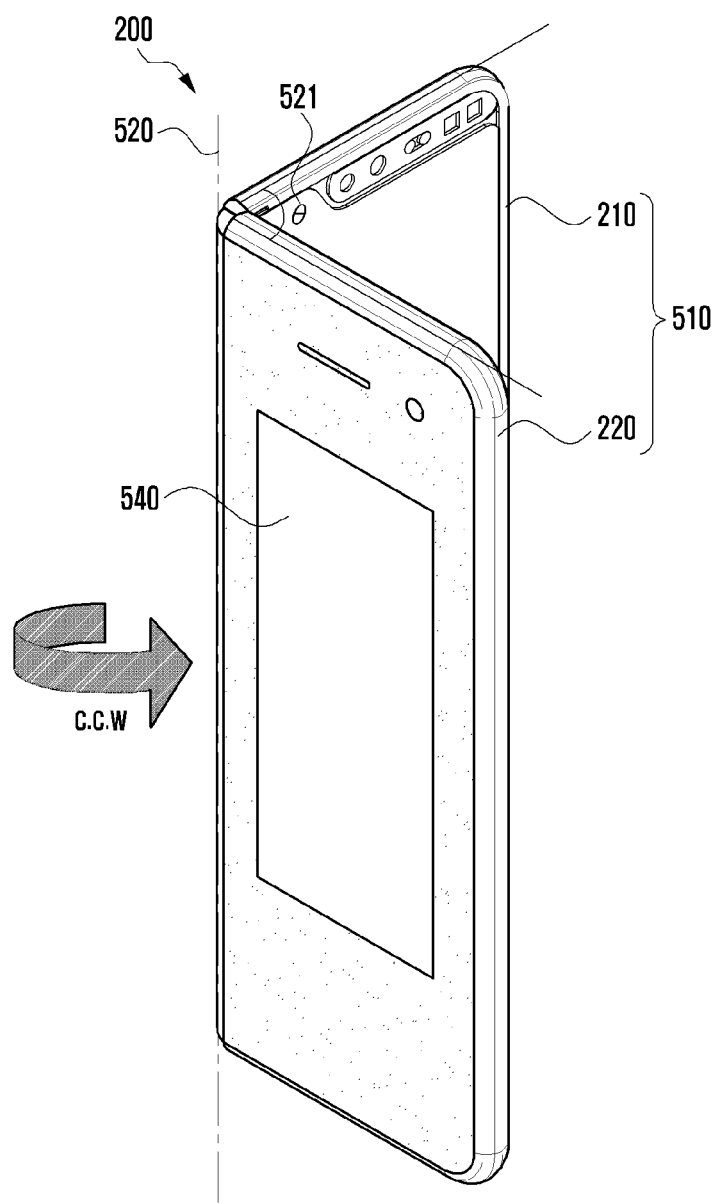
FIG. 5C is a perspective view illustrating an example electronic device in a partially folded state according to various embodiments of the disclosure.
Figure 5D:
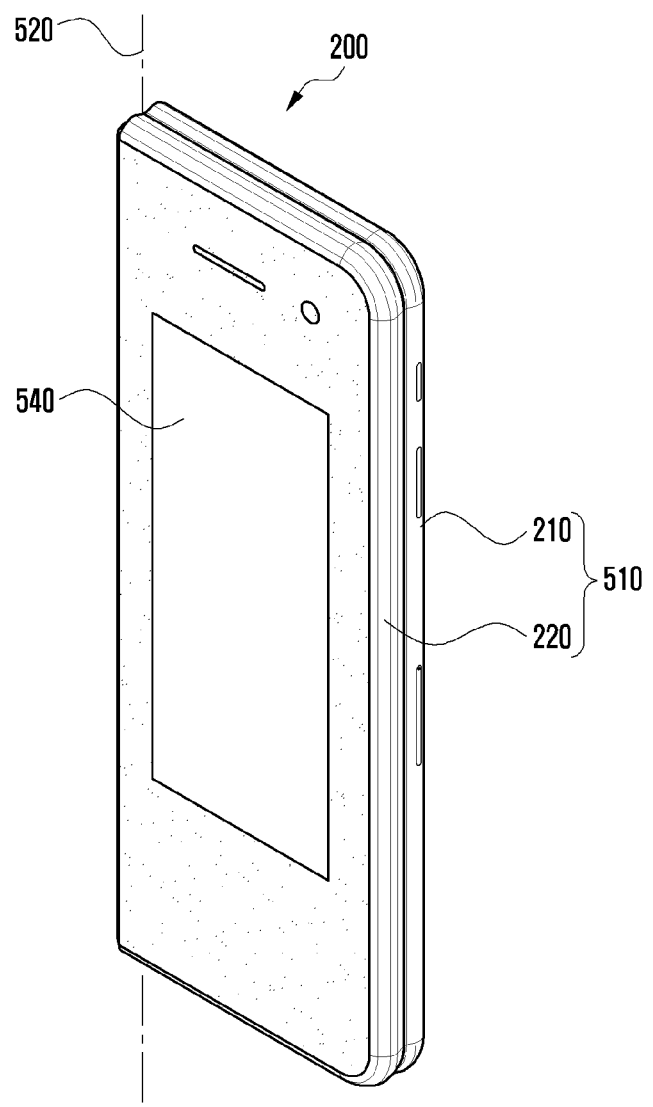
FIG. 5D is a diagram illustrating an example electronic device in a folded state according to various embodiments of the disclosure.
Figure 5E:
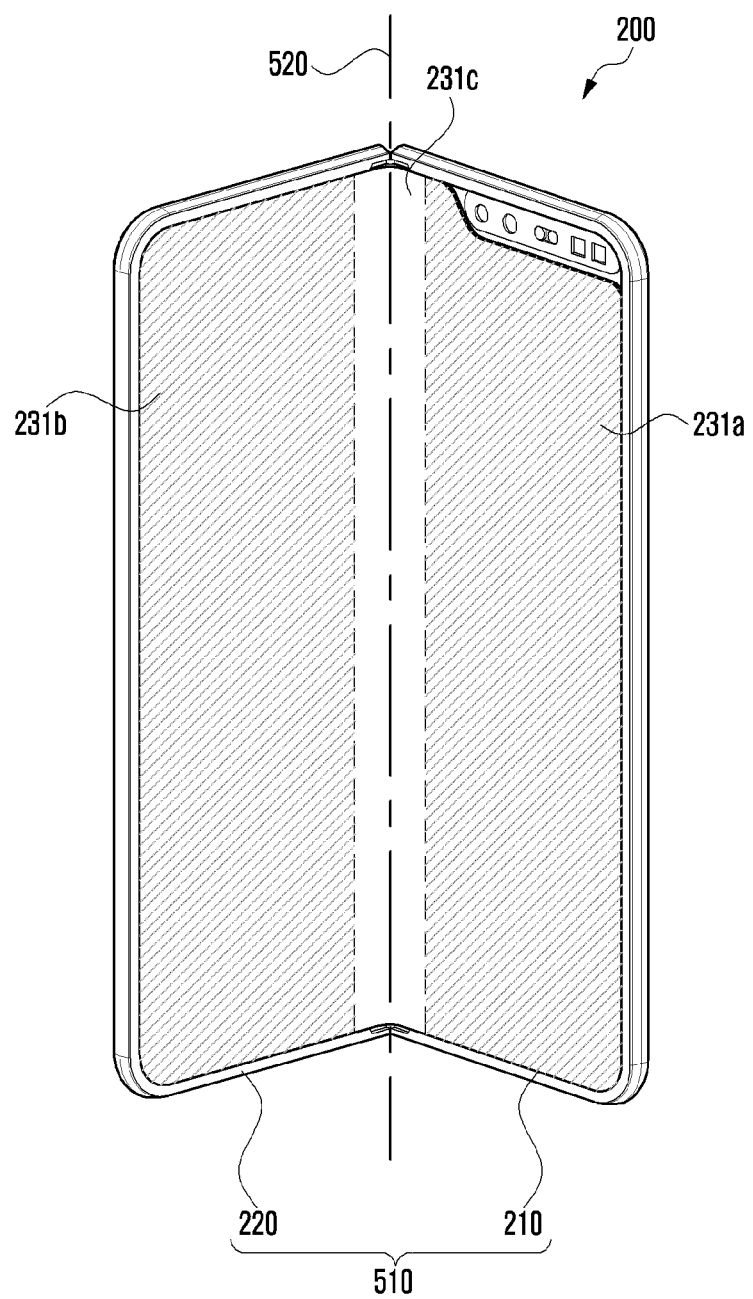
FIG. 5E is a diagram illustrating a phenomenon in which a specific area of a display is viewed to be distorted as compared with the other areas according to an angle between a first housing and a second housing in an example electronic device according to various embodiments of the disclosure.
Figure 5F:
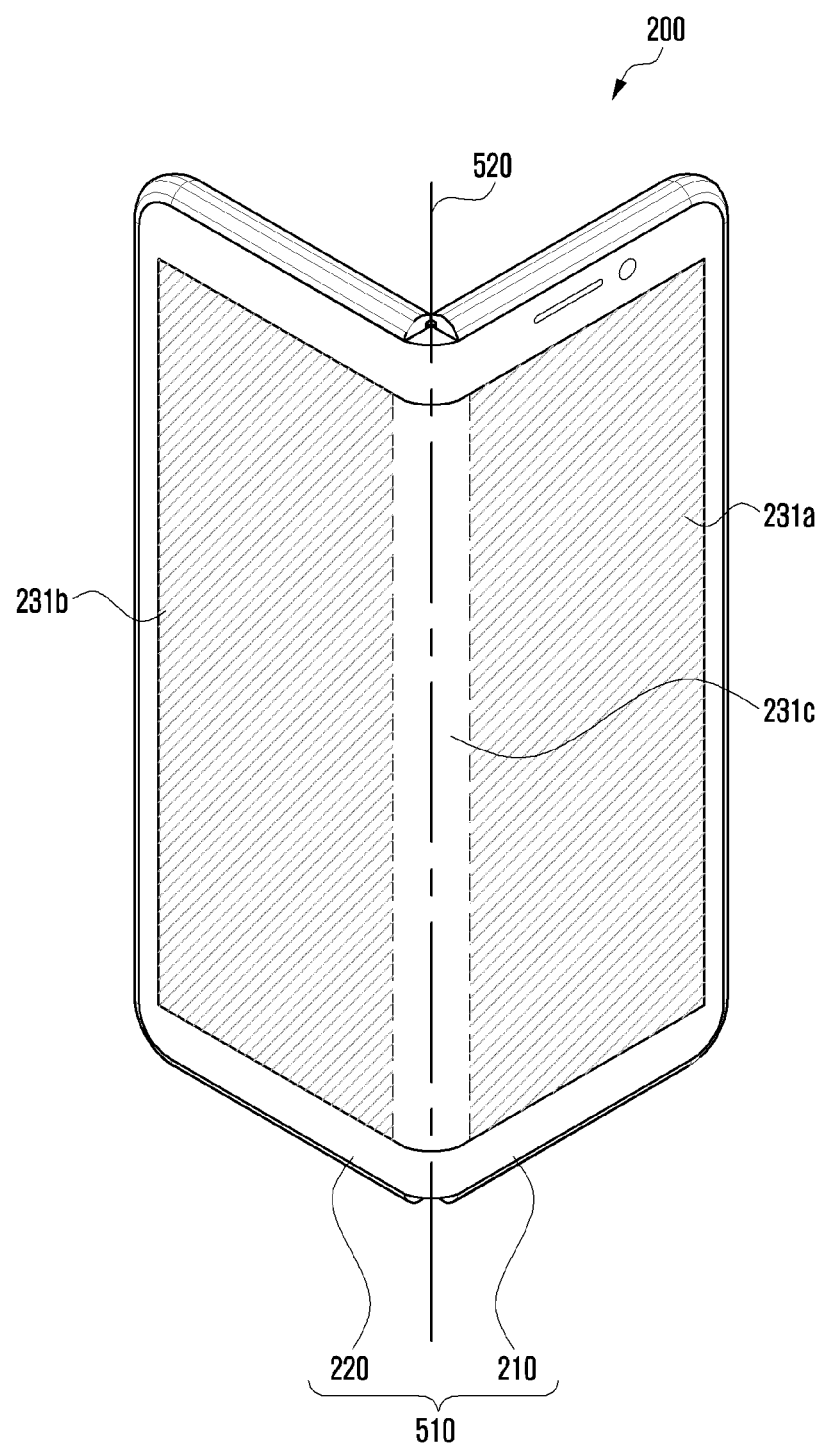
FIG. 5F is a diagram illustrating a phenomenon in which a specific area of a display is viewed to be distorted as compared with the other areas according to an angle between a first housing and a second housing in an example electronic device according to various embodiments of the disclosure.

FIG. 5A is a front perspective view of an example electronic device according to an embodiment of the disclosure; FIG. 5B is a rear perspective view of an example electronic device according to an embodiment of the disclosure; FIG. 5C is a diagram illustrating the example electronic device of FIGS. 5A and 5B in a partially folded state according to an embodiment of the disclosure; FIG. 5D is a diagram illustrating the example electronic device of FIG. 5C in a completely folded state according to an embodiment of the disclosure; FIG. 5E is a diagram illustrating a phenomenon in which a specific area of a display is viewed to be distorted as compared with other areas according to an angle between a first housing and a second housing in an example electronic device according to various embodiments of the disclosure; and FIG. 5F is a diagram illustrating a phenomenon in which a specific area of a display is viewed to be distorted as compared with other areas according to an angle between a first housing and a second housing in an example electronic device according to various embodiments of the disclosure.

FIGS. 5A, 5B, 5C, 5D, 5E, and 5F, an electronic device 200 (e.g., the electronic device 101 in FIG. 1) according to various embodiments may include a foldable housing 510, a first display 530, and a second display 540.

According to various embodiments, the electronic device 200 may include a foldable housing 510. The foldable housing 510 may include a first housing structure 210 and a second housing structure 220, which are connected by a hinge structure (e.g., the hinge structure 264 in FIG. 3).

According to various embodiments, the second housing structure 220 may be connected to the first housing structure 210 so as to be foldable. The first housing structure 210 and the second housing structure 220 may be foldable about a folding axis 520 {e.g., the folding axis (axis A) in FIG. 2A) extending in a first direction. The first housing structure 210 and the second housing structure 220 may be arranged to face each other in a folded state.

Referring to FIG. 5A, the first housing structure 210 and the second housing structure 220 may be at an angle of 180 degrees (e.g., an unfolded state). If the angle between the first housing structure 210 and the second housing structure 220 is equal to or greater than a predetermined angle, the electronic device 300 may be defined as being in an unfolded state. The predetermined angle may be 180 degrees, but may vary according to the designer's intention. If the electronic device 200 is in an unfolded state, the first housing structure 210 and the second housing structure 220 may form a planar structure.

According to various embodiments, the first display 530 (e.g., the display 230 in FIG. 2A) may be implemented as a single flexible display covering at least a portion of front surfaces of the first housing structure 210 and the second housing structure 220 (e.g., the first surface in FIG. 2A and the third surface 221 in FIG. 2A). The first display 530 may include a touch sensor for receiving a user touch input or a pressure sensor for receiving a pressure touch (or force touch) input of the user. While the electronic device 200 is in the folded state, one portion of the first display 530 implemented on the first housing structure 210 (e.g., the first area 231a in FIG. 2A) and the opposite portion of the first display 530 implemented on the second housing structure 220 (e.g., the second area 231b in FIG. 2A) may face each other. In an unfolded state of the electronic device 200, one portion of the first display 530 implemented on the first housing structure 210 and the opposite portion of the first display 530 implemented on the second housing structure 220 may form a plane. The first display 530 may include an area that is bent when folded or unfolded (e.g., the folding area 231c in FIG. 2A).

Referring to FIG. 5B, the electronic device 200 according to various embodiments may further include a second display 540 (e.g., the sub-display 252 in FIG. 2A). The second display 540 may be implemented on the surface other than the first display 520. For example, the first display 520 may be implemented on the front surface of the electronic device 200, and the second display may be implemented a second rear cover (e.g., the second rear cover 250 in FIG. 2A) provided on the rear surface thereof (e.g., the fourth surface 222 in FIG. 2A).

FIG. 5C is a diagram illustrating an electronic device 200 that is folded in a counterclockwise (CCW) direction about a folding axis 520 according to various embodiments. FIG. 5D is a diagram illustrating an example in which the electronic device 200 is fully folded about the folding axis 520 according to various embodiments.

Referring to FIGS. 5C and 5D, a user of the electronic device 200 may fold the electronic device 200 in an unfolded state about the folding axis 520, or may unfold the electronic device 200 in a folded state about the folding axis 520 by applying force thereto.

Referring to FIG. 5C, a state in which an angle 521 between a first housing structure 210 and a second housing structure 220 of an electronic device 200 is more than 0 degrees (a completely folded state) and less than 180 degrees (an unfolded state) may be defined as a transition state (e.g., a table mode in an electronic device implemented in an in-folding form or a kiosk mode in an electronic device implemented in an out-folding form).

The electronic device 200 according to various embodiments of the disclosure may display various screens on a first display 530 while the electronic device 200 is folded or unfolded (a change in the folding state of the electronic device 200). For example, the electronic device 200 may display a screen for an application that is being currently executed.

According to various embodiments of the disclosure, when the electronic device 200 is neither in a folded state nor in an unfolded state, a bent area (e.g., a folding area 231c) and a flat area (e.g., a first area 231a and a second area 231b) of the first display 530 may be viewed differently. For example, the luminance of the bent area may be different from the luminance of the flat area.

Referring to FIG. 5E, the electronic device 200 implemented in an in-folding structure, which may be folded such that the angle between the first housing structure 210 and the second housing structure 220 is between 0 to 180 degrees may be viewed such that the luminance of the bent area 231c is higher than the luminance of the flat areas 231a and 231b in a transition state.

Referring to FIG. 5F, the electronic device 200 implemented in an out-folding structure, which may be folded such that the angle between the first housing structure 210 and the second housing structure 220 is between 180 to 360 degrees may be viewed such that the luminance of the bent area 231c is higher than the luminance of the flat areas 231a and 231b in a transition state.

According to various embodiments of the disclosure, due to a change in the curvature of the bent area 231c, which changes while the electronic device 200 is folded or unfolded, the luminance of the bent area 231c may be different from the luminance of the flat areas 231a and 231b. The phenomenon may cause degradation of the visibility of the user. Hereinafter, various embodiments for adjusting the luminance in a bent area in consideration of the folding degrees of the first housing and the second housing will be described in greater detail with reference to the various drawings.

Figure 6:
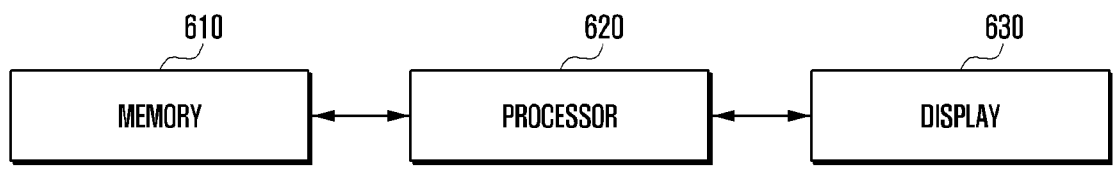
FIG. 6 is a block diagram illustrating an example electronic device according to various embodiments of the disclosure.

FIG. 6 is a block diagram illustrating an example electronic device according to various embodiments of the disclosure.

Referring to FIG. 6, an electronic device (e.g., the electronic device 200 of FIG. 2A) according to various embodiments of the disclosure may include a memory (e.g., the memory 130 of FIG. 1) 610, a processor (e.g., the processor 120 of FIG. 1) (e.g., including processing circuitry) 620, and a display (e.g., the display device 160 of FIG. 1 or the first display 530 of FIG. 5A) 630.

According to various embodiments of the disclosure, the display 630 may display various still images or videos under control of the processor 620.

According to various embodiments of the disclosure, the memory 610 may be operatively connected to the processor 620, and may store instructions for operating the processor 620. The processor 620 may include various processing circuitry and perform various operations by executing the instructions stored in the memory 610.

According to various embodiments, the processor 620 may identify a folding degree between the first housing structure (e.g., the first housing structure 210 of FIG. 5A) and the second housing structure (e.g., the second housing structure 220 of FIG. 5A). The method for measuring a folding degree between the first housing structure 210 and the second housing structure 220 may be performed through various methods including a method for measuring an angle between the first housing structure 210 and the second housing structure 220.

According to various embodiments of the disclosure, the processor 620 may be operatively connected to a sensor (not illustrated) that measures a folding degree (e.g., the angle 521 of FIG. 5C) between the first housing structure 210 and the second housing structure 220. The processor 620 may identify the folding degree between the first housing structure 210 and the second housing structure 220 based on data received from the sensor that measures the folding degree.

According to various embodiments of the disclosure, the processor 620 may measure the folding degree between the first housing structure 210 and the second housing structure 220 using at least one sensor (e.g., a Hall sensor) that may identify a folding state (a folded state or an unfolded state of the electronic device 200) of the electronic device 200.

According to various embodiments of the disclosure, the processor 620 may generate a first image based on mapping data in which the folding degree and characteristics of the first image, which will be generated, are mapped.

According to various embodiments of the disclosure, the first image may refer, for example, to an image that is to be overlaid on at least a partial area of the second image displayed on the display 630 to decrease the luminance or color difference of the bent area 231c and the flat areas 231a and 231b. The at least a partial area may, for example, be an area including a bent area (e.g., the bent area 231c of FIG. 5E or 5F). The first image may refer, for example, to a transparent image having a specific transparency to adjust the luminance of the bent area. By implementing the first image as a transparent image having a specific transparency, information, by which at least a portion of the second image included in the overlaid area is displayed, may be displayed in the same way regardless of whether the first image is overlaid or not. The second image may refer, for example, to various images including, for example, and without limitation, a video, a still image, an image simulated by various applications installed in the electronic device 200, or the like. For example, when the first image is not present, the second image may refer to an image in which a luminance or color difference of the bent area 231c and the flat areas 231a and 231b may occur. The first image may have the same size as that of the second image, but the size of the first image is not limited.

According to various embodiments of the disclosure, the mapping data may include data including a relationship between the folding degree between the first housing structure 210 and the second housing structure 220 and the transparency of the first image.

According to various embodiments of the disclosure, as the folding degree between the first housing structure 210 and the second housing structure 220 increases, the luminance difference of the bent area 231c and the flat areas 231a and 231b may increase. In order to reflect the phenomenon, the mapping data, for example, may be mapped such that the transparency of the first image decreases as the folding degree between the first housing structure 210 and the second housing structure 220 increases. As the transparency of the first image decreases, the luminance of the bent area 231c may decrease.

According to various embodiments of the disclosure, the processor 620 may generate the first image having a transparency corresponding to the folding degree with reference to the folding degree and the mapping data. The mapping data may include data on the transparency of the first image to adjust luminance. The processor 620 may generate the first image having a specific transparency with reference to mapping data. The processor 620 may generate the first image having a relatively low transparency to decrease luminance.

According to various embodiments of the disclosure, the mapping data may include data including a relationship between the folding degree between the first housing structure 210 and the second housing structure 220 and the size of the first image. The size of the first image may refer to the width of the first image. The adjustment of the size of the first image will be described in greater detail below with reference to FIGS. 7A, 7B, 7C, 7D and 7E.

According to various embodiments of the disclosure, as the folding degree between the first housing structure 210 and the second housing structure 220 increases, the size of the area in which the luminance difference of the bent area 231c and the flat areas 231a and 231b occurs may decrease. In order to reflect the phenomenon, the mapping data, for example, may be mapped such that the size of the first image decreases as the folding degree between the first housing structure 210 and the second housing structure 220 increases. The processor 620 may identify the size of the first image corresponding to the folding degree included in the mapping data, and may generate the first image having the identified size.

According to various embodiments of the disclosure, the processor 620 may generate a synthetic image in a manner of synthetizing the first image and the second image. The first image may refer, for example, to an image that is to be overlaid on at least a partial area of the second image. The at least a partial area may refer, for example, to an area including the bent area 231c. The processor 620 may control the display 630 such that the synthetic image is displayed. Through the operation, the processor 620 may decrease the luminance or color difference of the bent area 231c and the flat areas 231a and 231b, and may reinforce the visibility of the user.

According to various embodiments of the disclosure, the processor 620 may detect a change in the folding degree between the first housing structure 210 and the second housing structure 220 while the synthetic image is displayed, and may change characteristics of the first image in response to the change in the folding degree.

According to various embodiments of the disclosure, the processor 620 may identify the folding degree between the first housing structure 210 and the second housing structure 220 in response to the detection of the change in the folding degree. The method for measuring a folding degree between the first housing structure 210 and the second housing structure 220 may be performed through various methods including a method for measuring an angle between the first housing structure 210 and the second housing structure 220.

According to various embodiments of the disclosure, the processor 620 may change the characteristics of the first image based on the identified folding degree and the mapping data. The characteristics of the first image may refer, for example, to various characteristics of the first image including the transparency of the first image or the size of the first image. The processor 620 may generate a synthetic image in which the first image and the second image are synthesized in a manner in which the changed first image is overlaid on at least a partial area of the second image, and may control the display 630 such that the synthetic image is displayed. Through the operation, the processor 620 may decrease the luminance or color difference of the bent area 231c and the flat areas 231a and 231b, and may reinforce the visibility of the user.

According to another embodiment of the disclosure, the processor 620 may change the characteristics of the first image based on the identified folding degree and the mapping data. For example, as the folding degree between the first housing structure 210 and the second housing structure 220 increases, the number of the filter effects applied to the first image may increase. The processor 620 may generate a synthetic image in which the first image and the second image are synthesized in a manner in which the changed first image is overlaid on at least a partial area of the second image, and may control the display 630 such that the synthetic image is displayed. Through the operation, the processor 620 may output various effects according to the folding degree between the first housing structure 210 and the second housing structure 220 on the display 630. For example, the processor 620 may output, on the display 630, a screen in which the number of effects increases as the folding degree between the first housing structure 210 and the second housing structure 220 increases.

According to various embodiments of the disclosure, the electronic device 200 may reinforce the visibility of the user in consideration of the intensity of illumination of the area in which the electronic device 200 is present. For the operation, the electronic device 200 may further include an illumination sensor.

According to various embodiments of the disclosure, the processor 620 may identify the intensity of illumination of the area, in which the electronic device 200 is disposed, using the illumination sensor. The processor 620 may generate a third image based on the measured intensity of illumination and the data in which the characteristics of the third image, which will be generated, are mapped.

According to various embodiments of the disclosure, the third image may refer, for example, to an image of the second image displayed on the display 630, which is to be overlaid on at least a partial area of the second image, to decrease the degradation of the visibility of the user due to the intensity of illumination of the area, in which the electronic device 200 is disposed. The third image may have the same size as that of the second image, but the size of the third image is not limited. The third image may refer, for example, to a transparent image having a specific transparency to decrease the degradation of the visibility of the user due to the intensity of illumination. By implementing the third image with a transparent image having a specific transparency, information, by which at least a portion of the second image included in an area, in which the third image is overlaid, is displayed, may be displayed in the same way regardless of whether the third image is overlaid or not.

According to various embodiments of the disclosure, the data in which the characteristics of the third image are mapped may include data including a relationship between the intensity of illumination measured by the electronic device 200 and the luminance of the third image.

According to various embodiments of the disclosure, as the intensity of illumination around the electronic device 200 increases, the visibility of the screen displayed on the display 630 may decrease. To reflect the phenomenon, for example, the mapping data may be mapped such that the transparency of the third image increases as the intensity of illumination measured by the electronic device 200 increases. The processor 620 may, after generating a first synthetic image obtained by synthesizing the third image and the second image, generate the second synthetic image in a manner similar to the manner in which the first image is overlaid on at least a partial area of the synthetic image. The processor 620 may display the second synthetic image on the display 630. Through the operation, the processor 620 may decrease the luminance or color difference of the bent area 231c and the flat areas 231a and 231b and thus may reinforce the visibility of the user, and may prevent and/or reduce degradation of the visibility of the user due to the intensity of illumination around the electronic device 200.

A plurality of display driver integrated circuits may be necessary to adjust the luminance of a specific area (e.g., the bent area 231c) on the display 630. However, the electronic device according to various embodiments of the disclosure may adjust the luminance of the specific area on the display 630 using a single display driver integrated circuit. The display driver integrated circuit may store mapping data in the memory of the display driver integrated circuit. The display driver integrated circuit may adjust the luminance of a specific area by overlaying the first image for adjusting the luminance of the specific area on the bent area 231c with reference to the folding degree between the first housing structure 210 and the second housing structure 220 and the mapping data. Accordingly, the electronic device 200 according to various embodiments of the disclosure may adjust the luminance of the specific area even though one display driver integrated circuit is used.

Figure 7A:
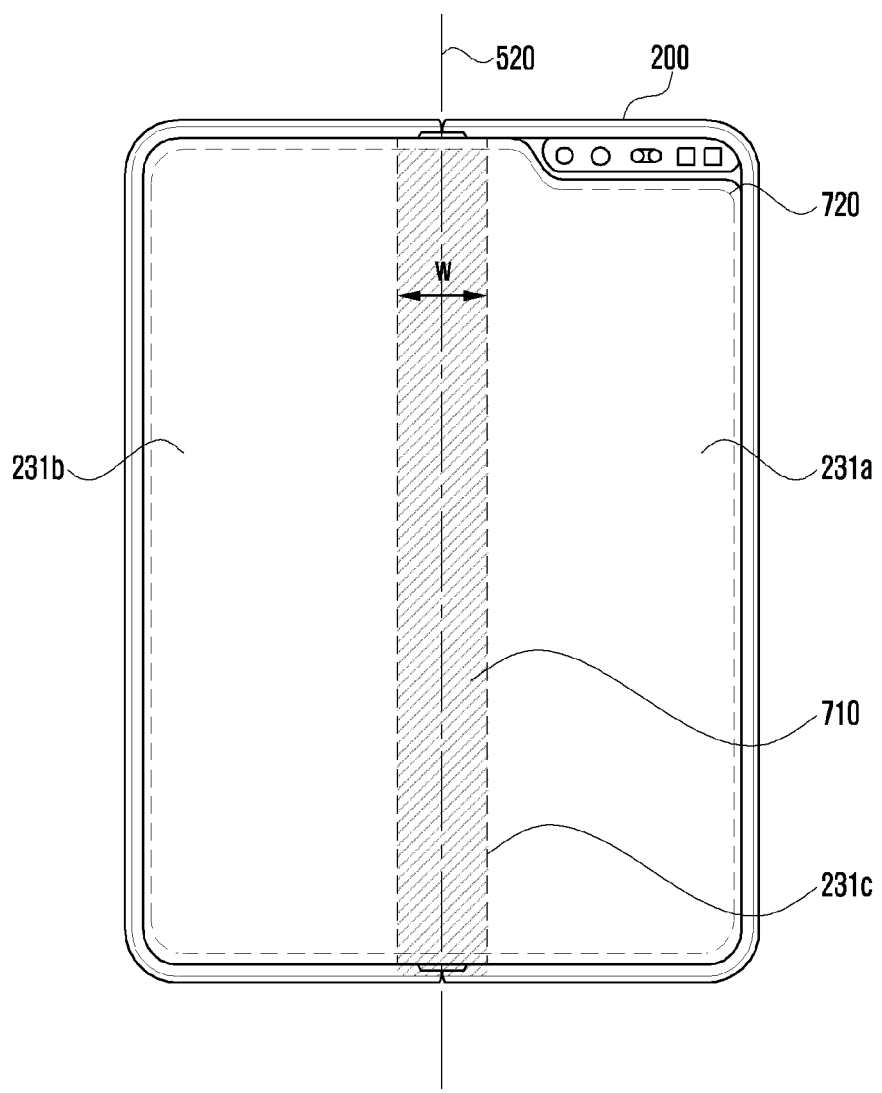
FIG. 7A is a diagram illustrating a example location at which an image is to be overlaid to reduce distortion in an electronic device according to various embodiments of the disclosure.
Figure 7B:
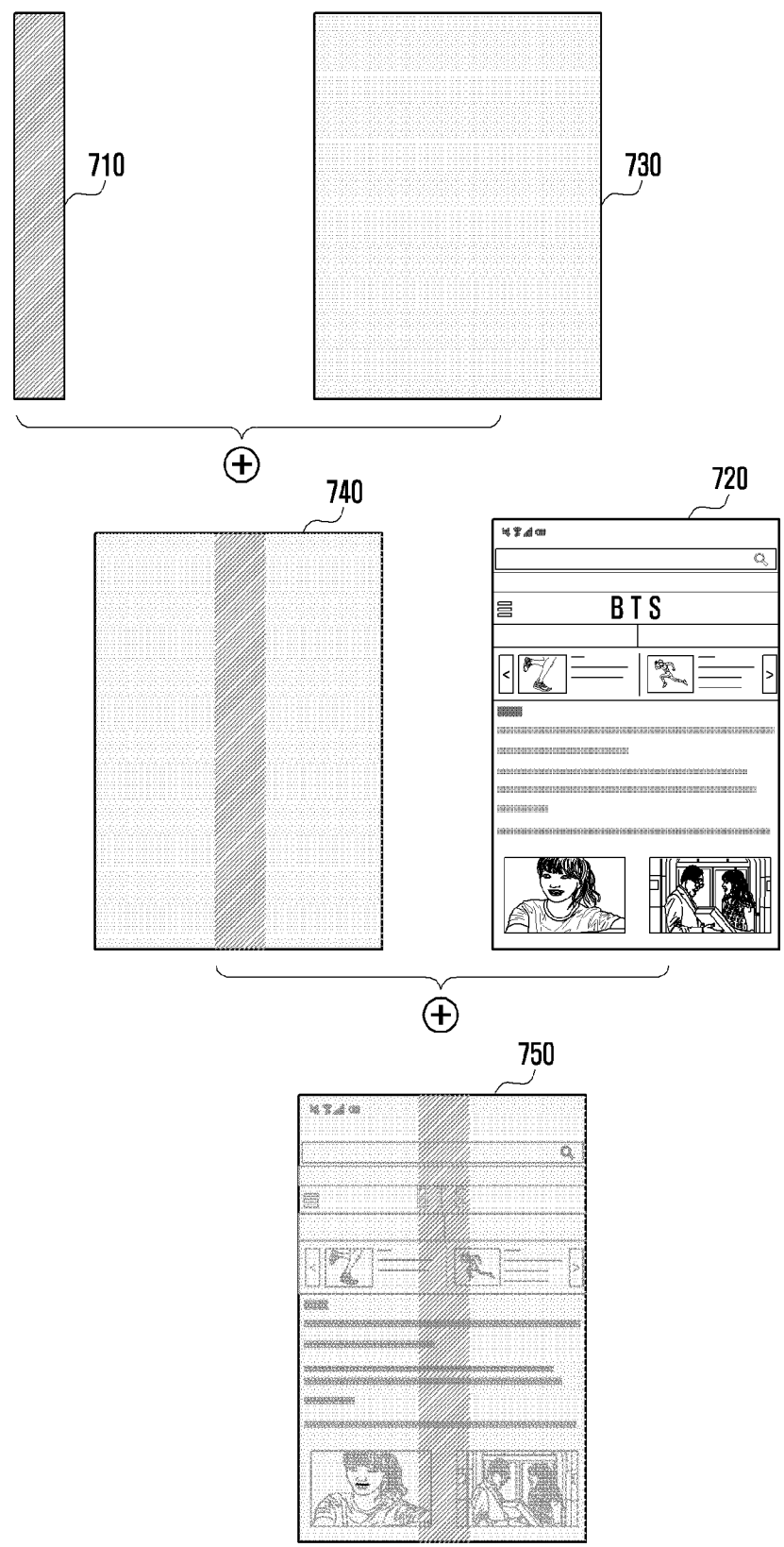
FIG. 7B is a diagram illustrating an example of synthesizing an image for decreasing distortion in to reduce distortion in an electronic device according to various embodiments of the disclosure.
Figure 7C:
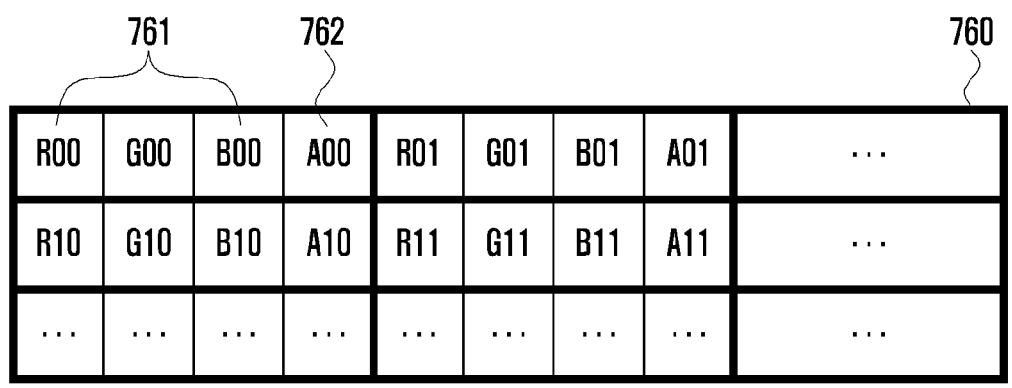
FIG. 7C is a diagram illustrating an example data structure of the first image according to various embodiments of the disclosure.
Figure 7D:
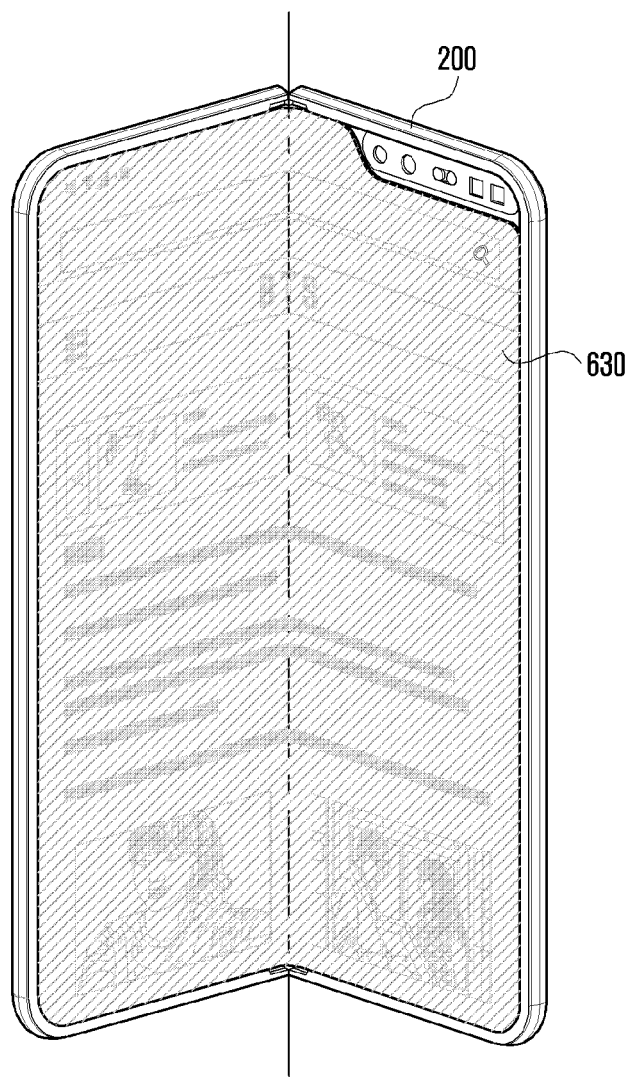
FIG. 7D is a diagram illustrating an example of displaying a second synthetic image in an example electronic device according to various embodiments of the disclosure.
Figure 7E:
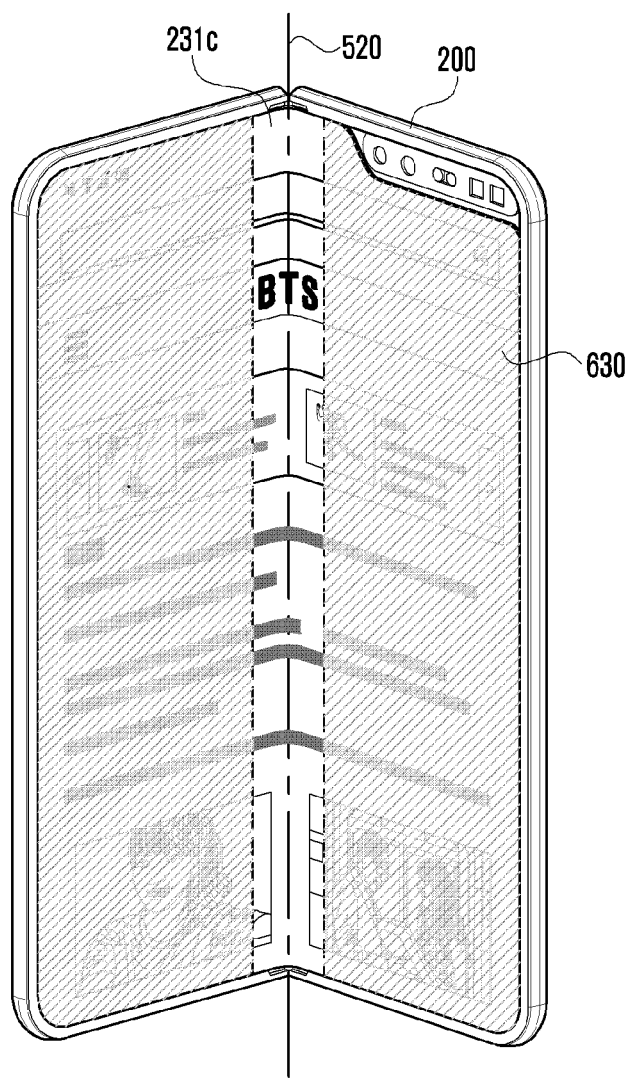
FIG. 7E is a diagram illustrating an example of displaying a second image in an example electronic device according to various embodiments of the disclosure.

FIG. 7A is a diagram illustrating an example of synthesizing an image for decreasing distortion in an electronic device according to various embodiments of the disclosure, FIG. 7B is a diagram illustrating an example of synthesizing an image for decreasing distortion in an electronic device according to various embodiments of the disclosure, FIG. 7C is a diagram illustrating an example data structure of the first image according to various embodiments of the disclosure, FIG. 7D is a diagram illustrating an example of displaying a second synthetic image in the electronic device according to various embodiments of the disclosure, and FIG. 7E is a diagram illustrating an example of displaying the second image in the electronic device according to various embodiments of the disclosure.

Referring to FIG. 7A, an electronic device 200 according to various embodiments of the disclosure may include a display (e.g., the display 630 of FIG. 6). The display 630 may be folded or unfolded about a folding shaft (e.g., the folding shaft 520 of FIG. 5). The display 630 may include a bent area 231*c* and flat areas 231*a* and 231*b*. The bent area 231*c* may refer to an area in which a curved portion is formed while the display 630 is folded or unfolded about the folding shaft. The flat areas 231*a* and 231*b* may refer to areas that are not bent, regardless of an operation of folding or unfolding the display 630 about the folding shaft.

According to various embodiments of the disclosure, the electronic device 200 may display a first image 710 on the bent area 231*c* to prevent and/or reduce distortion of a screen (e.g., the second image 720) that may occur while the first housing structure (e.g., the first housing structure 210 of FIG. 2*a*) and the second housing structure (e.g., the second housing structure 220 of FIG. 2A) are folded or unfolded.

According to various embodiments of the disclosure, the electronic device 200 may identify the folding degree between the first housing structure 210 and the second housing structure 220, and may identify the characteristics of the first image 710 based on the identified folding degree and the mapping data. The electronic device 200 may generate the first image 710 based on the identified characteristics. The electronic 200 may generate a synthetic image obtained by synthesizing the first image 710 and the second image 720, for example, in a manner in which the first image 710 is overlaid at a location corresponding to the bent area 231*c* of the second image 720, and may display the synthetic image.

According to various embodiments of the disclosure, the characteristics of the first image may include a transparency of the first image. The electronic device 200 may identify the transparency of the first image corresponding to the folding degree between the first housing structure 210 and the second housing structure 220 with reference to the mapping data, and may generate the first image having the identified transparency.

According to various embodiments of the disclosure, the characteristics of the first image may include the size of an area, in which the transparency of the first image is adjusted. The size of the area, in which the transparency of the first image is adjusted, may refer to the width W of the first image 710. The electronic device 200 may identify the size of the area, in which the transparency of the first image corresponding to the folding degree between the first housing structure 210 and the second housing structure 220 is adjusted, with reference to the mapping data, and may generate the first image having the identified size. The first image may have the same size as that of the second image, but the size of the first image is not limited. The first image may refer to a transparent image having a specific transparency to decrease the degradation of the visibility of the user due to the intensity of illumination. By implementing the first image with a transparent image having a specific transparency, information, by which at least a portion of the second image included in an area, in which the first image is overlaid, is displayed, may be displayed in the same way regardless of whether the first image is overlaid or not.

According to various embodiments of the disclosure, the electronic device 200 may identify the intensity of illumination of the area, in which the electronic device 200 is disposed, using the illumination sensor. The processor 620 may generate a third image based on the measured intensity of illumination and the data in which the characteristics of the third image, which will be generated, are mapped.

According to various embodiments of the disclosure, the third image may refer to an image of the second image displayed on the display 630, which is to be overlaid on at least a partial area of the second image, to decrease the degradation of the visibility of the user due to the intensity of illumination of the area, in which the electronic device 200 is disposed. The third image may have the same size as that of the second image, but the size of the third image is not limited. The third image may refer to a transparent image having a specific transparency to decrease the degradation of the visibility of the user due to the intensity of illumination. By implementing the third image with a transparent image having a specific transparency, information, by which at least a portion of the second image included in an area, in which the third image is overlaid, is displayed, may be displayed in the same way regardless of whether the third image is overlaid or not.

According to various embodiments of the disclosure, the data in which the characteristics of the third image are mapped may include data including a relationship between the intensity of illumination measured by the electronic device 200 and the luminance of the third image. As the intensity of illumination around the electronic device 200 increases, the visibility of the screen displayed on the display 630 may decrease. To reflect the phenomenon, for example, the mapping data may be mapped such that the luminance of the third image increases as the intensity of illumination measured by the electronic device 200 increases.

FIG. 7B is a diagram illustrating an example of synthesizing a first image 710, a second image 720, and a third image 730 in the electronic device 200 according to various embodiments of the disclosure.

The electronic device 200 according to various embodiments of the disclosure may generate a first synthetic image 740 obtained by synthesizing the first image 710 and the third image 730. The electronic device 200 may synthesize the second synthetic image 750 by synthesizing the first synthetic image and the second image 720. The electronic device 200 may control the display 630 such that the second synthetic image 750 is displayed.

FIG. 7C is a diagram illustrating an example data structure of the first image 710 according to an embodiment of the disclosure.

Referring to FIG. 7C, the data structure 760 of the first image 710 may include color data (e.g., RGB data or YUV data) 761 including color information of a plurality of pixels that comprise the first image 710 and transparency data 762.

According to various embodiments of the disclosure, the color data 761 may refer to color information of the plurality of pixels of the first image 710. When the color data 761 are realized in the form of RGB data, the color data 761 may include an R value, a G value, and a B value.

According to various embodiments of the disclosure, the transparency data 762 may refer to transparency information of the plurality of pixels that constitute the first image 710. The electronic device 200 may use the first image 710 having a relatively low transparency to decrease the luminance of the area in which the first image 710 is overlaid. The electronic device 200 may use the first image 710 having a relatively high transparency to increase the luminance of the first image 710.

According to various embodiments of the disclosure, the mapping data may include information of the first image 710 that is mapped differently according to the folding degree between the first housing structure 210 and the second housing structure 220. The electronic device 200 may generate the first image 710 that is to be synthesized based on the folding degree between the first housing structure 210 and the second housing structure 220 and the mapping data.

FIG. 7C illustrates the data structure of the first image 710, and the data structure may be a data structure that may be applied to both the third image 730 and the first synthetic image 740.

FIG. 7D is a diagram illustrating an example of displaying the second synthetic image 750 in the electronic device 200 according to various embodiments of the disclosure. FIG. 7E is a diagram illustrating an example of displaying the second image 740 in the electronic device 200 according to various embodiments of the disclosure.

Referring to FIG. 7D, the electronic device 200 may generate the first synthetic image 740 in which the first image 720 and the third image 730, which have been generated, are synthesized, may generate the second synthetic image 750 in a manner in which the first synthetic image 740 is overlaid on the second image 720 (see, e.g., FIG. 7B), and may control the display 630 such that the second synthetic image 750 is displayed.

According to various embodiments of the disclosure, the luminance or color difference of the bent area 231c and the flat areas 231a and 231b may decrease or various display effects (e.g., a screen blurring effect) may be output by displaying the first image 710 in a partial area of the second image 720 corresponding to the bent area 231c.

Referring to FIG. 7E, it may be identified that the luminance of the screen displayed in the bent area 231c is higher than the luminance of the screens displayed in the flat areas 231a and 231b. According to various embodiments of the disclosure, the luminance or color difference of the bent area 231c and the flat areas 231a and 231b may decrease by displaying the first image 720 generated such that the luminance thereof decreases in a partial area of the second image 720 corresponding to the bent area 231c.

Referring to FIG. 7D, the luminance of the screen displayed in the bent area 231c may be the same as the luminance of the screens displayed in the flat areas 231a and 231b. The electronic device 200 may enhance visibility by overlaying the first image 710 on the second image 750.

According to various embodiments of the disclosure, the area, on which the first image is overlaid, may be an area including at least a portion of the bent area 231c. The electronic device 200 may include at least one bent area 231c. When the electronic device 200 includes a plurality of bent areas, the first image 710 may overlaid for the plurality of bent areas. The characteristics of the image that is to be overlaid on the plurality of bent areas may be different. The characteristics of the image that is to be overlaid may be different according to the curvatures of the plurality of bent areas. For example, the transparency of the image that is to be overlaid on an area having a high curvature is lower than the transparency of the image that is to be overlaid on an area having a relatively low curvature, and the size of the image thereof may be small.

Figure 8:
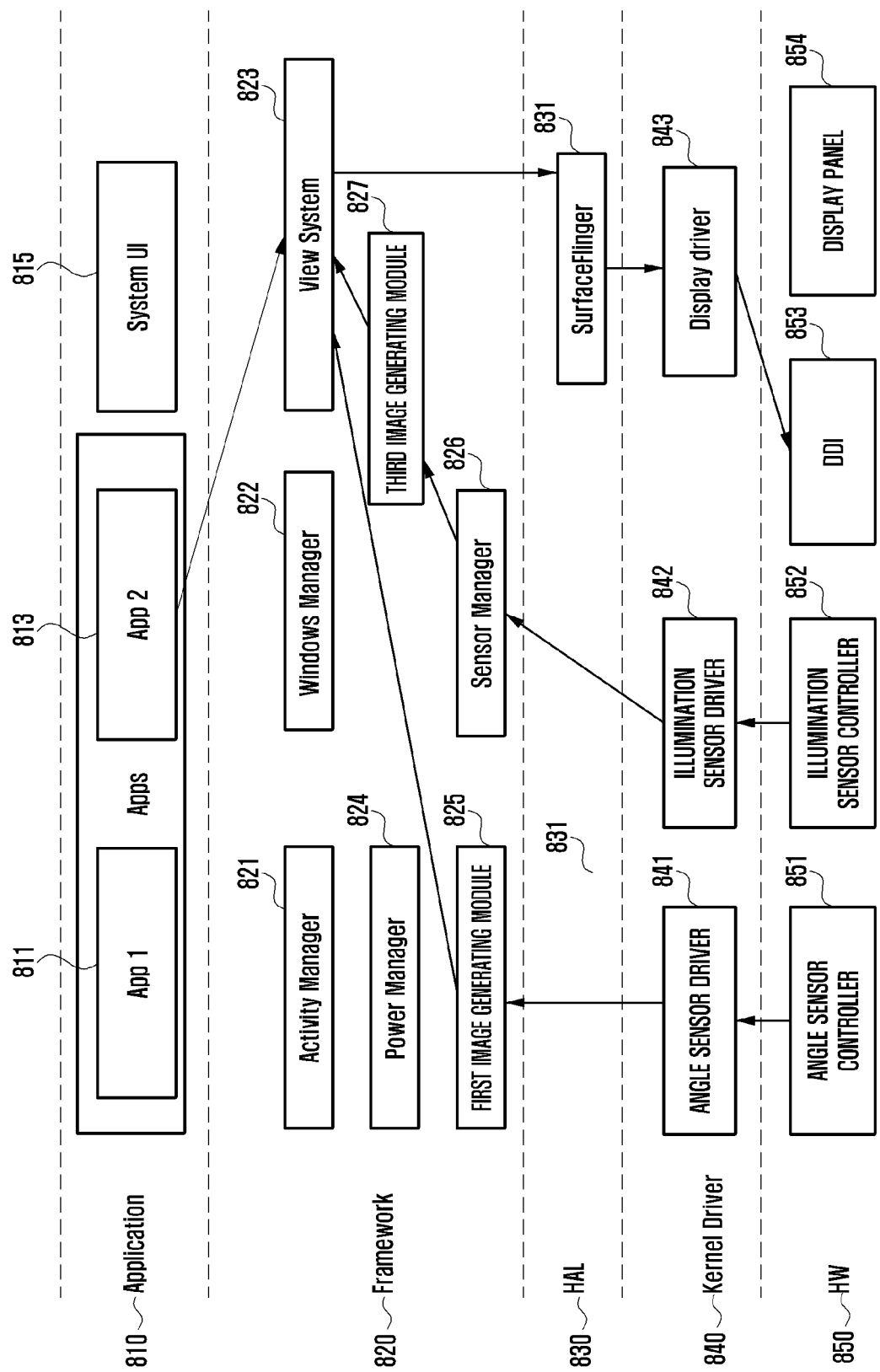
FIG. 8 is a diagram illustrating a module implemented in a software way for synthetizing an image in an electronic device according to various embodiments of the disclosure.

FIG. 8 is a diagram illustrating an example module implemented in software for synthetizing an image in an electronic device according to various embodiments of the disclosure.

Referring to FIG. 8, the elements implemented in software in the electronic device 200 according to various embodiments of the disclosure are illustrated according to the layers.

According to various embodiments of the disclosure, an application layer 810 may include applications Apps (application 1 App1 811 and application 2 App2 813) (e.g., the application 146 of FIG. 4) installed in the memory (e.g., the memory 610 of FIG. 6), and a system user interface (UI) 815. The system UI 815 may refer to an application for displaying a screen (e.g., a notification bar or a quick view) related to the system.

According to various embodiments of the disclosure, a framework layer 820 may provide applications 811 and 813 with various functions such that functions or information provided by one or more resources of the electronic device 200 may be used by the applications 811 and 813. The framework 720 may include an activity manager (e.g., the application manager 401 of FIG. 4) 821 that manages the life cycles of the applications 811 and 813, a windows manager 822 for managing one or more GUI resources that are displayed, a view system 823 that is a set of expandable views used for generation of a user interface of the application, a power manager 824 that manages a battery (e.g., the battery 189 of FIG. 1) of the electronic device 200, a first image generating module 825 for generating a first image (e.g., the first image 710 of FIG. 7A), a sensor manager 826 that controls a sensor (e.g., the sensor (e.g., the sensor module 176 of FIG. 1) of FIG. 1)), and a third image generating module 827 for generating a third image (e.g., the third image 730 of FIG. 7B).

According to various embodiments of the disclosure, a hardware abstraction layer (HAL) 830 may refer to an abstracted layer between a plurality of hardware modules included in a hardware layer 850 and software of the electronic device 200. The hardware abstraction layer 850 may include a surface flinger 831 that provides an interface for transmitting data transmitted by a view system 823 to a display driver 843.

According to various embodiments of the disclosure, a kernel driver layer 840 may include various drivers for controlling various hardware modules included in the electronic device 200. The kernel driver layer 840 may include an angle sensor driver 841 for controlling an angle sensor controller 851 that measures an angle between the first housing structure (e.g., the first housing structure 210 of FIG. 2A) and the second housing structure (e.g., the second housing structure 220 of FIG. 2A), an illumination sensor driver 842 for controlling an illumination sensor controller 852 that controls measurement of the intensity of illumination of an area in which the electronic device 200 is disposed, and a display driver 843 for controlling the display (e.g., the display 630 of FIG. 6).

According to various embodiments of the disclosure, the hardware layer 850 may refer to various pieces of hardware included in the electronic device 200. The hardware layer 850 may include an angle sensor controller 851 that measures an angle between the first housing structure 210 and the second housing structure 220, an illumination sensor controller 852 that controls measurement of the intensity of illumination of the area in which the electronic device 200 is disposed, a display driver integrated circuit 853 that controls a screen that is to be displayed on the display 630, and a display panel 854 that displays the screen.

According to various embodiments of the disclosure, the first image generating module 825 may receive information related to a folding degree between the first housing structure 210 and the second housing structure 220 from the angle sensor driver 841. The folding degree between the first housing structure 210 and the second housing structure 220 may be determined using an angle between the first housing structure 210 and the second housing structure 220.

According to various embodiments of the disclosure, the first image generating module 825 may identify the folding degree between the first housing structure 210 and the second housing structure 220, and may identify the characteristics of the first image 710 based on the identified folding degree and the mapping data. The first image generating module 825 may generate the first image 710 based on the identified characteristics. The first image generating module 825 may transmit the generated first image to the view system 823.

According to various embodiments of the disclosure, the third image generating module 827 may receive information related to the intensity of illumination of the area, in which the electronic device 200 is disposed, from the illumination sensor driver 842, and may generate the third image 730 based on the measured intensity of illumination and the data in which the characteristics of the third image are mapped. The third image generating module 827 may transmit the generated third image 730 to the view system 823.

According to various embodiments of the disclosure, the view system 823 may receive the first image 710 and the third image 720, and may synthesize them with the second image 730. The view system 823 may synthesize the first image 710 and the second image 730 in a manner in which the first image 710 is overlaid on a partial area of the second image 730. The area on which the first image 710 is overlaid may refer to an area including the bent area 213c. The view system 823 may generate a synthetic image in which the first image 710, the second image 730, and the third image 720 are synthesized, and may transmit the synthetic image to the display driver 843 through a surface flinger 831. The display driver 843 may control the display driver integrated circuit 853 such that the received synthetic image is displayed. The display driver integrated circuit 853 may control the display panel 854 such that the received synthetic image is displayed.

According to various embodiments of the disclosure, a subject that determines an operation of the view system 823 may be various elements (e.g., the power manager 824, the sensor manager 826, and the first image generating module 825) that constitute the framework according to an operation situation of the electronic device.

Although the embodiment has been illustrated under the assumption that the angle sensor driver 841 transmits the angle measured by the application processor, the angle sensor driver 841 may transmit the measured angle to the display driver integrated circuit 853. The display driver integrated circuit 853 may synthesize the first image 710 and the second image 730 in a manner in which the first image 710 corresponding to the received angle is overlaid on a partial area of the second image 730.

According to various example embodiments of the disclosure, an electronic device may include a foldable housing including a hinge, a first housing connected to the hinge, and a second housing connected to the hinge structure and configured to be foldable with the first housing about the hinge, a display including bent area in a state in which the first housing and the second housing are folded with respect to each other, a processor disposed in the first housing or the second housing and operatively connected to the display, and a memory operatively connected to the processor, and the memory may be configured to store instructions that, when executed, cause the processor to control the electronic device to: identify a folding degree between the first housing and the second housing, generate a first image based on mapping data including the folding degree and characteristics of the first image, generate a synthetic image of the first image and a second image corresponding to the bent area wherein the generated first image is overlaid in at least a partial area of the second image, and display the generated synthetic image.

According to various example embodiments of the disclosure, the mapping data may include a relationship between the folding degree and the transparency of the first image, and the memory may be configured to store instructions which, when executed, cause the processor to control the electronic device to: identify a transparency corresponding to the identified angle based on the mapping data, and generate the first image having the identified transparency.

According to various example embodiments of the disclosure, the mapping data may include data wherein the mapping reflects that the transparency of the first image decreases as the folding degree increases.

According to various example embodiments of the disclosure, the mapping data may include a relationship between the folding degree and the size of the first image, and the memory may be configured to store instructions which, when executed, cause the processor to control the electronic device to: identify the size of the first image corresponding to the identified angle based on the mapping data, and generate the first image having the identified size.

According to various example embodiments of the disclosure, the mapping data may include data wherein the mapping reflects that the size of the first image decreases as the folding degree increases.

According to various example embodiments of the disclosure, the memory may be configured to store instructions which, when executed, cause the processor to control the electronic device to: detect a change in the folding degree based the synthetic image being displayed, change characteristics of the first image based on the changed folding degree and the mapping data, generate a synthetic image of the first image and a second image wherein the first image including the changed characteristics is overlaid in at least a partial area of the second image, and display the generated synthetic image.

According to various example embodiments of the disclosure, the electronic device may further include an illumination sensor, and the memory may be configured to store instructions which, when executed, cause the processor to control the electronic device to: measure the intensity of illumination of an area in which the electronic device is disposed using the illumination sensor, generate a third image based on mapping data in which the measured intensity of illumination and characteristics of the third image are mapped, generate an synthetic image comprising the first image and the third image synthetized with the second image, and display the generated synthetic image.

According to various example embodiments of the disclosure, the mapping data may include data in which the mapping reflects that the transparency of the third image increases as the measured intensity of illumination increases.

According to various example embodiments of the disclosure, an electronic device may include a foldable housing including a hinge, a first housing connected to the hinge, and a second housing connected to the hinge and configured to be foldable with the first housing about the hinge, a display including a bent area defined by a state in which the first housing and the second housing are folded with respect to each other, a processor disposed in the first housing or the second housing and operatively connected to the display, and a memory operatively connected to the processor, and the memory may be configured to store instructions that, when executed, cause the processor to control the electronic device to: detect a change in a folding degree between the first housing and the second housing while a synthetic image including a first image generated based on mapping data including a folding degree between the first housing and the second housing and characteristics of the first image, is displayed and a second image corresponding to the bent area are synthetized with each other such that the first image is overlaid in a partial area of the second image, change characteristics of the first image based on the changed folding degree and the mapping data, and display the synthetic image such that the changed first image is overlaid in at least a partial area of the second image.

According to various example embodiments of the disclosure, the mapping data may include a relationship between the folding degree and the transparency of the first image, and the memory may be configured to store instructions which, when executed, cause the processor to control the electronic device to: identify a transparency corresponding to the folding degree based on the mapping data, and generate the first image having the identified transparency.

According to various example embodiments of the disclosure, the mapping data may include a relationship between the folding degree and a size of the first image, and the memory may be configured to store instructions which, when executed, cause the processor to control the electronic device to: identify the size of the first image corresponding to the identified angle based on the mapping data, and generate the first image having the identified size.

According to various example embodiments of the disclosure, the electronic device may further include an illumination sensor, and the memory may be configured to store instructions which, when executed, cause the processor to control the electronic device to: measure an intensity of illumination of an area in which the electronic device is disposed using the illumination sensor, generate a third image, based on mapping data in which the measured intensity of illumination and characteristics of the third image are mapped, generate an synthetic image comprising the first image and the third image synthetized with the second image, and display the generated synthetic image.

Figure 9:
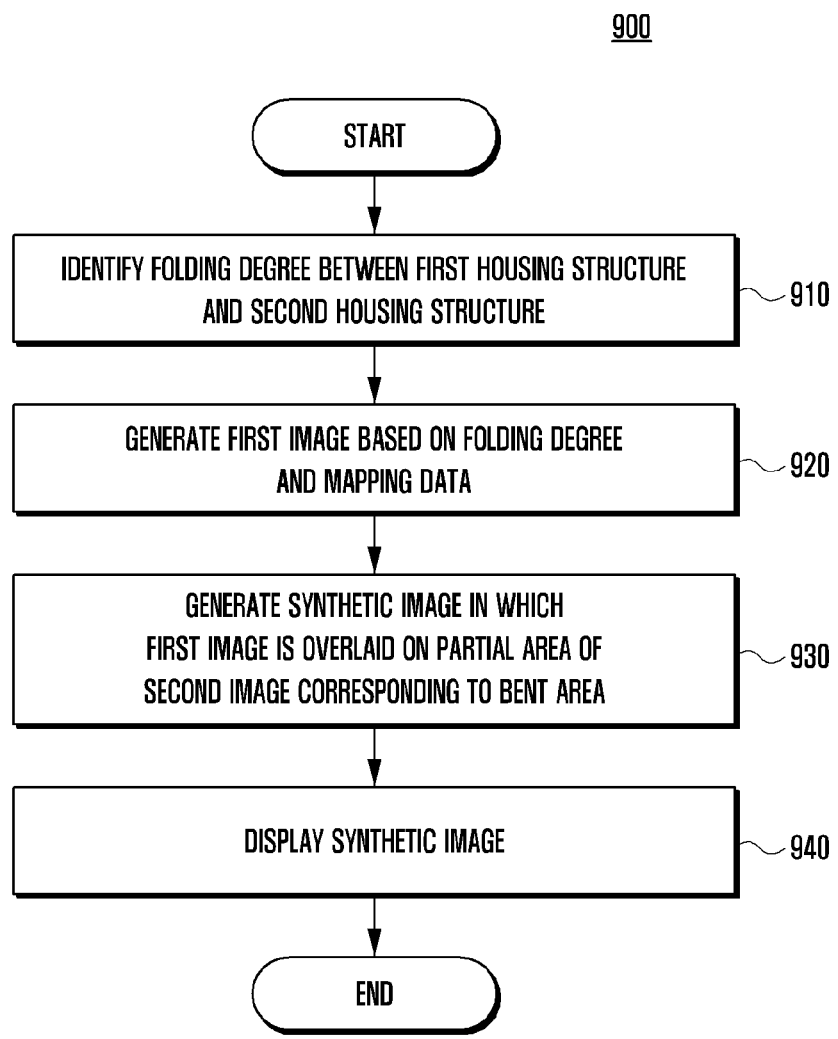
FIG. 9 is a flowchart illustrating an example method of operating an electronic device according to various embodiments of the disclosure.

FIG. 9 is a flowchart illustrating an example method of operating an electronic device according to various embodiments of the disclosure.

In operation 910 of a method 900 for operating an electronic device according to various embodiments of the disclosure, an electronic device (e.g., the electronic device 200 of FIG. 2A) may identify a folding degree between a first housing structure (e.g., the first housing structure 210 of FIG. 2A) and a second housing structure (e.g., the second housing structure 220 of FIG. 2B).

According to various embodiments of the disclosure, the folding degree between the first housing structure 210 and the second housing structure 220 may be identified through various methods including an angle between the first housing structure 210 and the second housing structure 220.

According to various embodiments of the disclosure, the electronic device 200 may identify the folding degree between the first housing structure 210 and the second housing structure 220 based on data received from a sensor (not illustrated) that measures a folding degree (e.g., the angle 521 of FIG. 5C) between the first housing structure 210 and the second housing structure 220.

According to various embodiments of the disclosure, in operation 920, the electronic device 200 may generate a first image (e.g., the first image 710 of FIG. 7A) based on the folding degree and the mapping data.

According to various embodiments of the disclosure, the first image may refer to an image that is to be overlaid on at least a partial area of the second image displayed on the display 630 to decrease the luminance or color difference of the bent area 231c and the flat areas 231a and 231b. The at least a partial area may be an area including a bent area (e.g., the bent area 231c of FIG. 5E or 5F). The first image may refer to a transparent image having a specific transparency to adjust the luminance of the bent area. By implementing the first image with a transparent image having a specific transparency, information, by which at least a portion of the second image included in the overlaid area is displayed, may be displayed in the same way regardless of whether the first image is overlaid or not. The second image may refer to various images including a video, a still image, or an image simulated by various applications installed in the electronic device 200. In particular, when the first image is not present, the second image may refer to an image in which a luminance or color difference of the bent area 231c and the flat areas 231a and 231b may occur.

According to various embodiments of the disclosure, the mapping data may include data including a relationship between the folding degree between the first housing structure 210 and the second housing structure 220 and the transparency of the first image.

According to various embodiments of the disclosure, as the folding degree between the first housing structure 210 and the second housing structure 220 increases, the luminance difference of the bent area 231c and the flat areas 231a and 231b may increase. In order to address the phenomenon, the mapping data, for example, may be mapped such that the transparency of the first image decreases as the folding degree between the first housing structure 210 and the second housing structure 220 increases. As the first image having a low transparency is overlaid, the luminance of the portion, on which the first image is overlaid, may decrease, and the luminance difference of the bent area 231c and the flat areas 231a and 231b may decrease.

According to various embodiments of the disclosure, the electronic device 200 may generate the first image having a transparency corresponding to the folding degree with reference to the folding degree and the mapping data. The mapping data may include data on the transparency of the first image to adjust luminance. The electronic device 200 may generate the first image having a specific transparency in a manner of adjusting the transparency of the first image. The processor 620 may generate the first image having a relatively low transparency to decrease luminance.

According to various embodiments of the disclosure, the mapping data may include data including a relationship between the folding degree between the first housing structure 210 and the second housing structure 220 and the size of the first image. The size of the first image may refer to the width of the first image.

According to various embodiments of the disclosure, as the folding degree between the first housing structure 210 and the second housing structure 220 increases, the size of the area in which the luminance difference of the bent area 231*c* and the flat areas 231*a* and 231*b* occurs may decrease. In order to reflect the phenomenon, the mapping data, for example, may be mapped such that the size of the first image decreases as the folding degree between the first housing structure 210 and the second housing structure 220 increases. The electronic device 200 may identify the size of the first image corresponding to the folding degree included in the mapping data, and may generate the first image having the identified size.

According to various embodiments of the disclosure, in operation 930, the electronic device 200 may generate a synthetic image in which the first image 710 is overlaid on at least a partial area of the second image (e.g., the second image 730 of FIG. 7B) corresponding to the bent area (e.g., the bent area 231*c* of FIG. 5E).

According to various embodiments of the disclosure, in operation 940, the electronic device 200 may display a synthetic image on the display 630.

Figure 10:
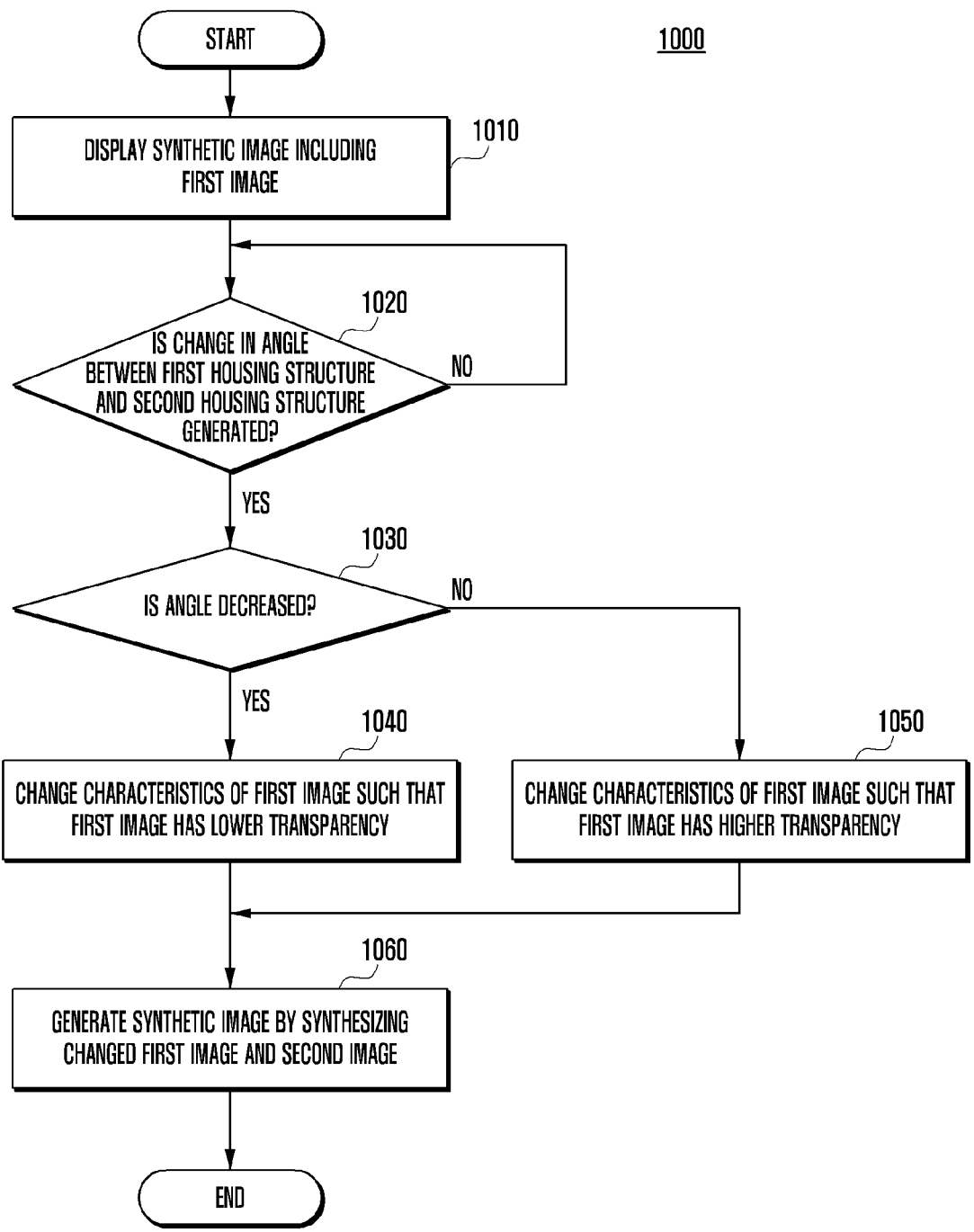
FIG. 10 is a flowchart illustrating an example method of operating an electronic device according to another embodiment of the disclosure.

FIG. 10 is a flowchart illustrating an example method of operating an electronic device according to another embodiment of the disclosure.

The operation illustrated in FIG. 10 may be applied to the electronic device 200 implemented by an in-folding structure in which the angle between the first housing structure 210 and the second housing structure 220 may be folded by between 0 to 180 degrees.

In operation 1010 of a method 1000 for operating an electronic device according to various embodiments of the disclosure, an electronic device (e.g., the electronic device 200 of FIG. 2A) may display a synthetic image (e.g., the second synthetic image 750 of FIG. 7B) including a first image (e.g., the first image 710 of FIG. 7B).

According to various embodiments of the disclosure, in operation 1020, the electronic device 200 may identify whether the angle between the first housing structure 210 and the second housing structure 220 changed.

According to various embodiments of the disclosure, in operation 1030, the electronic device 200 may identify whether the angle between the first housing structure 210 and the second housing structure 220 decreased in response to the identification 1020-YES of the change in the angle between the first housing structure 210 and the second housing structure 220.

According to various embodiments of the disclosure, in operation 1040, the electronic device 200 may change the characteristics of the first image 710 such that the first image 710 has a transparency that is lower than that of the first image 710 displayed previously, in response to the identification 1030-YES of the decrease in the angle between the first housing structure 210 and the second housing structure 220.

According to various embodiments of the disclosure, in operation 1050, the electronic device 200 may change the characteristics of the first image 710 such that the first image 710 has a transparency that is higher than that of the first image 710 displayed previously, in response to the identification 1030-NO of the increase in the angle between the first housing structure 210 and the second housing structure 220.

According to various embodiments of the disclosure, in operation 1060, the electronic device 200 may generate a synthetic image obtained by synthesizing the first image 710 with the second image 730.

According to various embodiments of the disclosure, the electronic device 200 may generate a synthetic image in a manner in which the first image 710 is overlaid on a partial area of the second image (e.g., the second image 730 of FIG. 7B) corresponding to the bent area (e.g., the bent area 231*c* of FIG. 5E).

Figure 11:
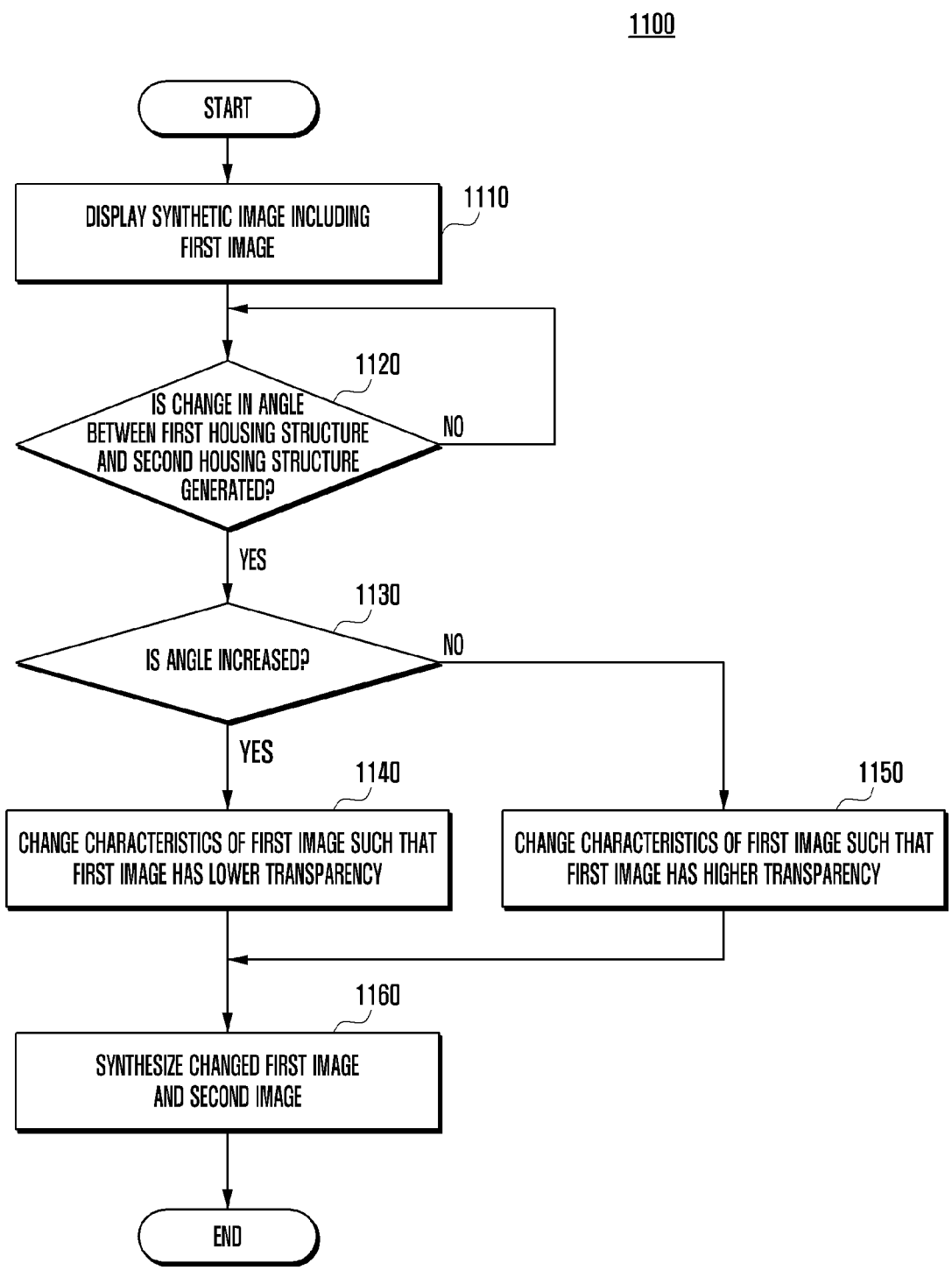
FIG. 11 is a flowchart illustrating an example method of operating an electronic device according to another embodiment of the disclosure.

FIG. 11 is a flowchart illustrating an example method of operating an electronic device according to another embodiment of the disclosure.

The operation illustrated in FIG. 11 may be applied to the electronic device 200 implemented by an out-folding structure in which the angle between the first housing structure 210 and the second housing structure 220 may be folded by about 180 to 360 degrees.

In operation 1110 of a method 1100 for operating an electronic device according to various embodiments of the disclosure, an electronic device (e.g., the electronic device 200 of FIG. 2A) may display a synthetic image (e.g., the second synthetic image 750 of FIG. 7B) including a first image (e.g., the first image 710 of FIG. 7B).

According to various embodiments of the disclosure, in operation 1120, the electronic device 200 may identify whether the angle between the first housing structure 210 and the second housing structure 220 changed.

According to various embodiments of the disclosure, in operation 1130, the electronic device 200 may identify whether the angle between the first housing structure 210 and the second housing structure 220 increased in response to the identification 1120-YES of the change in the angle between the first housing structure 210 and the second housing structure 220.

According to various embodiments of the disclosure, in operation 1140, the electronic device 200 may change the characteristics of the first image 710 such that the first image 710 has a transparency that is lower than that of the first image displayed previously, in response to the identification 1130-YES of the increase in the angle between the first housing structure 210 and the second housing structure 220.

According to various embodiments of the disclosure, in operation 1150, the electronic device 200 may change the characteristics of the first image 710 such that the first image 710 has a transparency that is higher than that of the first image 710 displayed previously, in response to the identification 1130-NO of the decrease in the angle between the first housing structure 210 and the second housing structure 220.

According to various embodiments of the disclosure, in operation 1160, the electronic device 200 may generate a synthetic image obtained by synthesizing the changed first image 710 with the second image 730.

According to various embodiments of the disclosure, the electronic device 200 may generate a synthetic image in a manner in which the first image 710 is overlaid on at least a partial area for decreasing luminance while increasing the transparency of the second image 730.

According to various example embodiments of the disclosure, a method for operating an electronic device may include identifying a folding degree between a first housing connected to a hinge, and a second housing connected to the hinge and foldable with the first housing about the hinge, generating a first image, based on mapping data in which the folding degree and characteristics of the first image are mapped, generating a synthetic image of the first image and a second image corresponding to the bent area wherein the generated first image is overlaid in at least a partial area of the second image, and displaying the generated synthetic image.

According to various example embodiments of the disclosure, the mapping data may include a relationship between the folding degree and the transparency of the first image, and the generating of the first image may include identifying a transparency corresponding to the folding degree based on the mapping data, and generating the first image having the identified transparency.

According to various example embodiments of the disclosure, the mapping data may include data reflecting that the transparency of the first image decreases as the folding degree increases.

According to various example embodiments of the disclosure, the mapping data may include a relationship between the folding degree and a size of the first image, and the generating of the first image may include identifying the size of the first image corresponding to the identified angle based on the mapping data, and generating the first image having the identified size.

According to various example embodiments of the disclosure, the mapping data may include data reflecting that the size of the first image decreases as the folding degree increases.

According to various example embodiments of the disclosure, the method may further include detecting a change in the folding degree while the synthetic image is displayed, changing characteristics of the first image based on the changed folding degree and the mapping data, generating a synthetic image of the first image and a second image wherein the changed first image is overlaid in at least a partial area of the second image, and displaying the generated synthetic image.

According to various example embodiments of the disclosure, the method may further include measuring an intensity of illumination of an area in which the electronic device is disposed using an illumination sensor, generating a third image based on mapping data in which the measured intensity of illumination and characteristics of the third image are mapped, generating an synthetic image in which the first image and the third image are synthetized with the second image, and displaying the generated synthetic image.

According to various example embodiments of the disclosure, the mapping data may include data reflecting that the transparency of the third image increases as the measured intensity of illumination increases.

The electronic device according to various example embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various example embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a cone sponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While various example embodiments of the disclosure have been illustrated and described with reference to the various drawings, it will be understood that the various example embodiments are intended to be illustrative, not limiting. One of ordinary skill in the art will understand that various changes in form and detail may be made without departing from the spirit and scope of the disclosure, including the appended claims and their equivalents.

What is claimed is:

1. An electronic device comprising:
    a foldable housing comprising:
    a hinge;
    a first housing connected to the hinge; and
    a second housing connected to the hinge and configured to be foldable with the first housing about the hinge;
    a display comprising a first flat area corresponding to at least a portion of the first housing and a second flat area corresponding to at least a portion of the second housing, and further comprising a bent area between the first flat area and the second flat area in a state in which the first housing and the second housing are folded with respect to each other;
    a processor disposed in the first housing or the second housing and operatively connected to the display; and
    a memory operatively connected to the processor,
    wherein the memory is configured to store instructions that, when executed, cause the processor to control the electronic device to:
    identify a folding degree between the first housing and the second housing;
    generate a first image based on mapping data in which the folding degree and characteristics of the first image are mapped;
    generate a synthetic image by synthetizing the first image with a second image corresponding to the bent area wherein the generated first image is overlaid in at least a partial area of the second image;
    display the generated synthetic image;
    detect a change in the folding degree while the synthetic image is displayed;
    change characteristics of the first image based on the changed folding degree and the mapping data;
    modify the synthetic image, wherein the first image having the changed characteristics is overlaid in the at least partial area of the second image; and
    display the modified synthetic image.

2. The electronic device of claim 1, wherein the mapping data includes a relationship between the folding degree and a transparency of the first image, and
    wherein the memory is configured to store instructions which, when executed, cause the processor to control the electronic device to:
    identify a transparency corresponding to the identified angle based on the mapping data; and
    generate the first image having the identified transparency.

3. The electronic device of claim 2, wherein the mapping data includes data reflecting that the transparency of the first image decreases as the folding degree increases.

4. The electronic device of claim 1, wherein the mapping data includes a relationship between the folding degree and a size of the first image, and
    wherein the memory is configured to store instructions which, when executed, cause the processor to control the electronic device to:
    identify the size of the first image corresponding to the identified angle based on the mapping data; and
    generate the first image having the identified size.

5. The electronic device of claim 4, wherein the mapping data includes data reflecting that the size of the first image decreases as the folding degree increases.

6. The electronic device of claim 1, further comprising:
    an illumination sensor,
    wherein the memory is configured to store instructions which, when executed, cause the processor to control the electronic device to:
    measure an intensity of illumination of an area in which the electronic device is disposed using the illumination sensor;
    generate a third image based on mapping data in which the measured intensity of illumination and characteristics of the third image are mapped;
    generate an synthetic image in which the first image and the third image are synthetized with the second image; and
    display the generated synthetic image.

7. The electronic device of claim 6, wherein the mapping data includes data reflecting that a transparency of the third image increases as the measured intensity of illumination increases.

8. An electronic device comprising:
    a foldable housing comprising:
    a hinge;
    a first housing connected to the hinge; and
    a second housing connected to the hinge and configured to be foldable with the first housing about the hinge;
    a display comprising a bent area in a state in which the first housing and the second housing are folded with respect to each other;
    a processor disposed in the first housing or the second housing and operatively connected to the display; and
    a memory operatively connected to the processor,
    wherein the memory is configured to store instructions that, when executed, cause the processor to control the electronic device to:
    detect a change in a folding degree between the first housing and the second housing while a synthetic image in which a first image, generated based on mapping data in which the folding degree between the first housing and the second housing and characteristics of the first image are mapped, is displayed and a second image corresponding to the bent area are synthetized with each other such that the first image is overlaid in a partial area of the second image;
    change characteristics of the first image based on the changed folding degree and the mapping data; and
    display the synthetic image of the first image and the second image wherein the changed first image is overlaid in at least a partial area of the second image.

9. The electronic device of claim 8, wherein the mapping data includes a relationship between the folding degree and a transparency of the first image, and
wherein the memory is configured to store instructions which, when executed, cause the processor to control the electronic device to:
identify a transparency corresponding to the folding degree based on the mapping data; and
generate the first image having the identified transparency.

10. The electronic device of claim 8, wherein the mapping data includes a relationship between the folding degree and a size of the first image, and
wherein the memory is configured to store instructions which, when executed, cause the processor to control the electronic device to:
identify the size of the first image corresponding to the identified angle based on the mapping data; and
generate the first image having the identified size.

11. The electronic device of claim 8, further comprising:
an illumination sensor,
wherein the memory is configured to store instructions which, when executed, cause the processor to control the electronic device to:
measure an intensity of illumination of an area in which the electronic device is disposed using the illumination sensor;
generate a third image based on mapping data in which the measured intensity of illumination and characteristics of the third image are mapped;
generate a synthetic image in which the first image and the third image are synthetized with the second image; and
display the generated synthetic image.

12. A method of operating an electronic device comprising a display including a first flat area, a second flat area and a bent area between the first flat area and the second flat area, the method comprising:
identifying a folding degree between a first housing connected to a hinge, and a second housing connected to the hinge and being foldable with the first housing about the hinge;
generating a first image based on mapping data in which the folding degree and characteristics of the first image are mapped;
generating a synthetic image by synthetizing the first image with a second image corresponding to the bent area wherein the generated first image is overlaid in at least a partial area of the second image;
displaying the generated synthetic image;
detecting a change in the folding degree while the synthetic image is displayed;
changing characteristics of the first image based on the changed folding degree and the mapping data;
modifying the synthetic image, wherein the first image having the changed characteristics is overlaid in the at least partial area of the second image; and
displaying the modified synthetic image.

13. The method of claim 12, wherein the mapping data includes a relationship between the folding degree and a transparency of the first image, and
wherein the generating of the first image comprises:
identifying a transparency corresponding to the folding degree based on the mapping data; and
generating the first image having the identified transparency.

14. The method of claim 13, wherein the mapping data includes data reflecting that the transparency of the first image decreases as the folding degree increases.

15. The method of claim 12, wherein the mapping data includes a relationship between the folding degree and a size of the first image, and
wherein the generating of the first image comprises:
identifying the size of the first image corresponding to the identified angle based on the mapping data; and
generating the first image having the identified size.

16. The method of claim 15, wherein the mapping data include data reflecting that the size of the first image decreases as the folding degree increases.

17. The method of claim 12, further comprising:
measuring an intensity of illumination of an area in which the electronic device is disposed using an illumination sensor;
generating a third image based on mapping data in which the measured intensity of illumination and characteristics of the third image are mapped;
generating a synthetic image in which the first image and the third image are synthetized with the second image; and
displaying the generated synthetic image.

18. The method of claim 17, wherein the mapping data includes data reflecting that a transparency of the third image increases as the measured intensity of illumination increases.

* * * * *